US011577288B2

(12) United States Patent
Murata et al.

(10) Patent No.: US 11,577,288 B2
(45) Date of Patent: Feb. 14, 2023

(54) SHREDDER DUST PROCESSING METHOD AND PROCESSING DEVICE FOR SAME

(71) Applicant: ENVITECH ENGINEERING CO., LTD., Tokyo (JP)

(72) Inventors: Kozo Murata, Tokyo (JP); Toshiro Miyake, Tokyo (JP)

(73) Assignee: ENVITECH ENGINEERING Co., LTD., Tokyo (JP)

( * ) Notice: Subject to any disclaimer, the term of this patent is extended or adjusted under 35 U.S.C. 154(b) by 331 days.

(21) Appl. No.: 16/652,940

(22) PCT Filed: Mar. 22, 2018

(86) PCT No.: PCT/JP2018/011342
§ 371 (c)(1),
(2) Date: Apr. 1, 2020

(87) PCT Pub. No.: WO2019/176123
PCT Pub. Date: Sep. 19, 2019

(65) Prior Publication Data
US 2020/0261952 A1    Aug. 20, 2020

(30) Foreign Application Priority Data

Mar. 15, 2018  (JP) .............................. JP2018-048552

(51) Int. Cl.
*B09B 5/00*          (2006.01)
*B09B 3/00*          (2022.01)
(Continued)

(52) U.S. Cl.
CPC .................. *B09B 3/00* (2013.01); *B09B 5/00* (2013.01); *B02C 2201/06* (2013.01);
(Continued)

(58) Field of Classification Search
CPC ..... B03B 9/06; B03B 9/061; B03B 2009/068; B02C 23/10; B02C 23/14; B02C 2201/06;
(Continued)

(56) References Cited

U.S. PATENT DOCUMENTS 3,790,091 A * 2/1974 Law .......................... C10L 5/46
44/589
5,611,493 A * 3/1997 Hayashi ................ B02C 18/142
241/23
(Continued)

FOREIGN PATENT DOCUMENTS

| JP | 2000-51830 A | 2/2000 |
| JP | 2001-113231 A | 4/2001 |

(Continued)

*Primary Examiner* — Joseph C Rodriguez
(74) *Attorney, Agent, or Firm* — Taro Yaguchi

(57) ABSTRACT

A shredder dust treatment method is provided wherein non-metal dust which is further pulverized into a small particle size in a pulverizing step S10 through a crushing step S1 of crushing wastes such as waste automobiles, waste home appliances, and waste office furniture into a predetermined size, an iron component separation and collection step S3 of separating and collecting an iron component, a non-ferrous component separation and collection step S4 of separating and collecting a non-ferrous component, a metal component separation and collection step S5 of sorting a metal component, wind power sorting steps S2, S6, S8, and S9 of sorting floating fibrous dust and a settled crushed material by wind power, and a shredding step S7 of shredding the settled crushed material into a predetermined size is separated into metal scraps such as copper, aluminum, and iron, fibrous dust, and particulate dust in a separating step S11.

16 Claims, 21 Drawing Sheets

(51) Int. Cl.
  *B03B 9/06* (2006.01)
  *B29B 17/02* (2006.01)
  *B09B 101/02* (2022.01)

(52) U.S. Cl.
  CPC ......... *B03B 9/061* (2013.01); *B03B 2009/068* (2013.01); *B09B 2101/02* (2022.01); *B29B 17/02* (2013.01); *B29B 2017/0272* (2013.01)

(58) Field of Classification Search
  CPC ......... B29B 17/02; B29B 17/272; B09B 3/00; B09B 5/00; B09B 2101/02
  See application file for complete search history.

(56) References Cited

U.S. PATENT DOCUMENTS

| | | | | |
|---|---|---|---|---|
| 6,086,000 | A * | 7/2000 | Murata | B03B 9/061 |
| | | | | 241/DIG. 38 |
| 8,627,960 | B2 * | 1/2014 | Valerio | B07B 4/02 |
| | | | | 209/139.1 |
| 9,132,432 | B2 * | 9/2015 | Andersen | B29B 17/02 |
| 11,213,830 | B2 * | 1/2022 | Primavera | C22B 7/005 |
| 2008/0257794 | A1 * | 10/2008 | Valerio | B03B 9/061 |
| | | | | 209/567 |
| 2011/0017644 | A1 * | 1/2011 | Valerio | B07C 5/344 |
| | | | | 209/44.1 |
| 2017/0259274 | A1 * | 9/2017 | Adams | B02C 23/10 |

FOREIGN PATENT DOCUMENTS

| | | |
|---|---|---|
| JP | 2001-116226 A | 4/2001 |
| JP | 2002-192137 A | 7/2002 |

* cited by examiner

[FIBROUS DUST TREATMENT LINE]

SHREDDER DUST PROCESSING METHOD AND PROCESSING DEVICE FOR SAME

FIELD OF THE INVENTION

The present invention relates to a technique for recycling wastes of automobiles, home appliances, or office furniture. In particular, the invention relates to a method of separating metal from shredder dust and fueling an organic combustible residue, a method of effectively using an inorganic residue, and a treatment device thereof in order to separate and collect metal scraps from shredder dust obtained by crushing automobiles, home appliances, or office furniture and recycle non-metal scraps corresponding to a residue.

BACKGROUND OF THE INVENTION

Industrial wastes of automobiles, home appliances, and office furniture are crushed and pulverized by a hammer mill type shredder when recycling them. Among the industrial wastes which are crushed and pulverized, fibrous light dust entangled with a wire harness sucked by a dust collector is called "shredder dust". For example, as shown in a working flowchart of FIG. 27, the shredder dust is a general term for non-valuable materials in which most (80% or more) of contents excluding metal which can be eliminated from crushed and pulverized materials obtained by crushing and pulverizing waste automobiles, waste home appliances, waste office furniture, or the like by a hammer mill type crusher is non-metal.

When waste automobiles, waste home appliances, waste office furniture, or the like are input to the hammer mill type crusher, a cylindrical rotor with several dozen cast hammers (having a weight of 75 kg to 250 kg/piece) attached to a hammer shaft so as to hang outward from the center of the hammer crushes waste automobiles, waste home appliances, waste office furniture, or the like while rotating 600 times per minute and discharges metal and non-metal from a lower grid of the crusher in a broken state. The size of the crushed material to be discharged is different according to the size of the hole of the lower grid of the crusher.

A crushed material includes "light dust" which is sucked by a dust collector in addition to "iron" which is sorted and accumulated by a magnet drum or the like, "non-ferrous metal" which is separated, collected, and accumulated by an automatic non-ferrous separator using a homopolar magnet, "stainless steel" which cannot be separated by the automatic non-ferrous separator, and heavy "non-metal dust". Among the five types of sorted materials, the "light dust (fibrous dust and particulate dust)" is a treatment object of the invention called shredder dust.

This shredder dust had to be brought to a controlled landfill site with sheets in the 1990s. Due to the change of related laws and regulations, the disposal fee to the controlled landfill site has jumped from 6,000 to 30,000 yen per ton and becomes a price five times higher in several years. For that reason, illegal dumping to the valleys and islands not corresponding to dumping sites or dumping sites just corresponding to dug holes has not stopped. The amount of illegal dumping of shredder dust discovered in Teshima, Shikoku, in 1990 was as high as 900,000 tons. In order to process this 900,000 tons, a tax of 28 billion yen was used and a report on the completion of the process was made in 2017. This 900,000 tons is comparable to today's annual shredder dust emissions. Under such circumstances, the automaker and the Ministry of Economy, Trade and Industry at that time cooperated to start a system to prevent illegal dumping while listening to the actual situation from scrapers. As a result, the automobile recycling law has come into effect in 2005 and shredder dust disposal cost was paid by individual automobile owners and corporate owners for recycling cost. Then, an organization of participation of automobile makers named TH and ART newly created by using the paid money as a fund created a mechanism to distribute the shredder processing cost to the shredder dust discharger. However, legal processing responsibility came to be borne by the automobile manufacturer. However, the destination of shredder dust is specified by TH and ART and the transportation cost up to that point must be paid by the shredder discharger. The largest amount of shredder dust is generated in the Kanto area where about 10% of the Japanese population lives. However, shredder dust is being sent to incinerators in the Tohoku area such as Aomori. If the distance is far, shipping cost will increase and vehicle purchasing cost, property tax, and the like will increase. Such geographical factors are considered to be one of the reasons why the amount of shredder dust that cement manufacturers have declared as treated is lower than the expected amount calculated each year based on the type and number of waste automobiles. Alternatively, it may be temporarily placed in a mountainous leased land as it has been treated and placed in a flexible container.

In particular, shredder dust discharged from waste automobiles still contains about 10 to 15% by weight of metals such as iron, copper, aluminum, and stainless steel. Using in an underhanded way the terms of the Basel Convention that the waste containing these valuable materials and useful materials was allowed to be exported with payment, the waste was illegally exported until 2017. Also, even if the waste is incinerated, metals are burned in an incinerator of a cement plant despite the fact that metals can be taken out in a clean state close to the raw materials as in the invention. Thus, since all metals are oxidized, their regeneration value is significantly reduced. From the viewpoint of processing wastes and recycling resources, it is essential to reduce the load on the final disposal site by collecting more valuable materials from the shredder dust as high in purity as possible and reducing the amount of non-burning wastes such as soil, glass, and pottery contained in the shredder dust. In the invention, since soil, glass, pottery, and the like are made into powder by various crushers and the powder enters bubbles of polyurethane, the powder burns along with polyurethane. Although waste automobiles, waste home appliances, and waste office furniture take a main position of building a thermal and material recycling system among the first-class designated products, China has imported with payment not only metal mixed waste but anything from waste plastic as well in recent decades and most shredder dust has begun to be burned in the incinerators of cement manufacturers under the automobile recycling law from 2005. Accordingly, in Japan, a troublesome and complex shredder dust treatment technique has hardly progressed. Under such circumstances, China implemented a ban on the import of waste plastic from January 2018 as declared in the summer of 2017. As a result, imports of waste plastic in China decreased by 99% from January last year. From March 2018, the import of copper wire (nugget) scraps mixed with waste plastic such as 0.5% or more of copper wire covering material was banned.

Automobiles are mostly made of metals such as iron, copper, and aluminum and many useful parts such as batteries, catalysts, and engines are used as used parts. When dismantling waste automobiles and recycling various parts and components, harmful materials such as fluorocarbons and batteries and dangerous materials such as oil, gasoline, and airbags are first eliminated and then car bodies are crushed to collect target iron scraps. Next, plastics and non-ferrous metals such as valuable copper, brass, aluminum, and stainless steel are collected from mixed scraps called non-magnetic mixed metals.

However, wire harnesses (copper wires wrapped in cars) are not included in the above-described mixed metals because they are drawn into the dust collector together with polyurethane and fiber dust. Tires, batteries, engines, bumpers, and the like can be used as second-hand parts or can be separated and thus they are manually taken out as shown in the working flowchart of FIG. 28. Freon gases are collected as harmful materials and airbags are collected as dangerous materials. Non-reusable oil, engines, and tires are manually collected.

In the next step after eliminating the above-described valuables, useful materials, reusable parts, harmful materials, and dangerous materials, metal such as chassis and frame of waste automobiles is crushed along with glass and seat materials (seat). A metal crushed material separation and collection step is provided after the crushing step. In the first step of separating and collecting the metal crushed material, magnetic materials such as metal are adsorbed, sorted, and accumulated by using a magnetic force of a magnet drum or the like. Iron taken out by the crusher is collected. A non-ferrous metal scrap separation and collection step is provided after the step of collecting magnetic materials such as iron. In this collection step, automatic non-ferrous separators (commonly called eddy current, linear in Japan) that sort non-ferrous metals such as copper and brass and aluminum, wind sorting that applies wind to light plastics compared to metals, and manual sorting performed by people is used.

"Fibrous lightweight dust" derived from waste automobiles and discharged from these steps are not easily sorted only by hands or sorting devices and are sucked by dust collectors, and the dust is called Automobile Shredder Residue (ASR).

However, the treatment target products of the invention include not only waste automobiles but also waste home appliances or waste office furniture since the treatment method is the same. Therefore, the abbreviation of ASR described in the invention also includes Shredder Residue (SR).

Therefore, in the invention, both ASR and SR will be referred to as shredder dust unless there is a special limiting element.

There has been proposed a technique of separating and collecting metals corresponding to valuable materials and dust corresponding to non-metal and useful materials from the shredder dust and reusing them as resources. For example, a "shredder dust treatment method" disclosed in JP 2000-51830 A of Patent Literature 1 proposes a shredder dust treatment method including (1) a first crushing step, (2) a step of separating and collecting metals from a first crushed material, (3) a second crushing step, (5) a step of separating and collecting metals from a second crushed material, (6) a third crushing step, (7) a step of separating and collecting non-ferrous metals and non-metals from a third crushed material, and (8) a step of collecting and recycling dust or the like.

CITATION LIST

[Patent Document]

SUMMARY OF THE INVENTION

Problem to be Solved by the Invention

Even after the automobile recycling law which came into force in 2005, since there was no established technique for treating shredder dust containing useful organic materials, most shredder dust is still burned in incinerators of cement manufacturers. That is, the useful material is burned without being reused. In other words, even at present, one million tons of shredder dust is emitted every year all over Japan. That is, the natural environment is still heavily loaded in terms of exhaust gas treatment in combustion treatment.

Further, in some cases, waste plastic is added by 5 to 10 times the amount to shredder dust to produce RPF. However, there are many cases in which a shredder dust processor refuses to take over because the content of copper, which is a catalyst for combustible chlorine and dioxin generation, exceeds 1%.

Further, in the shredder dust (ASR) which is discharged when treating waste automobiles, since useful products that can be used as tires, batteries, engines, bumpers, and other used parts, useful materials, and reusable metal fragments are separated and collected considerably, the proportion of polyurethane or sheet material in this shredder dust tends to increase year by year. This trend does not change even in the mainstream era of electric vehicles (EV). This shredder dust (ASR) derived from waste automobiles means lightweight dust which is sucked by a dust collector and is called "Shredder Fluff" in Europe. The shredder dust includes "particulate (granular) dust" mainly containing plastic, rubber, coating materials of wire harness (copper wire), and wood chips heavier than "fibrous dust" in addition to polyurethane or fiber "fibrous (cotton-like) dust".

Regarding the generation of the floating "fibrous dust" or the non-floating "particulate dust" corresponding to simple waste in the past, the burning calorie of polyurethane is 7,000 kcal/kg which is equivalent to coal. Accordingly, the inventor of the invention has noticed that the waste would replace coal (fuel) currently imported from abroad. Incidentally, Japan's annual import volume of coal is about 200 million tons.

On the other hand, the total generation amount of shredder dust from Japanese waste automobiles (ASR) is about one million tons annually. Since 55 to 61% of ASR is "fibrous dust" and 25% thereof is "particulate dust" also in the experiment result of the inventor, it means that it is possible to make a fuel that can replace approximately 800,000 to 860,000 tons of industrial coal and coke annually from both dusts if the invention is used. Since this amount is only about 0.4% of Japan's total imports of coal, it is an amount that can be used for industrial purposes reasonably without changing the quality and calorific properties of the coal currently being used as a partial replacement or auxiliary agent for coal or coke. In addition, polyurethane is already used as a reducing agent in blast furnaces or converters. Aluminum is also used as a reducing agent in blast furnaces or electric furnaces. Among residual metallic elements in "fibrous dust", aluminum is the highest in content. As shown in the metal element analysis table in Table 1 described later, this fact also suggests that "fibrous dust" is suitable not only for fuel but also for a reducing agent.

The inventor has focused on the fact that the "fibrous dust" can be made as fuel and auxiliary fuel corresponding to a substitute for coal used by thermal power plants, reducing agents for blast furnaces and electric furnaces, or high-quality defoamers for converters if the specific gravity of the final product can be raised to 2 or more because the dust has high combustion calories. The combustible chlorine component of "fibrous dust" is close to general waste (0.4 to 0.6%). Since burned calories are as high as 7,000 kcal/kg equivalent to coal, the dust can be used not only in a thermal power plant, but also as an auxiliary fuel to replace pulverized coal in municipal incinerators just by performing a sealing treatment to suppress a transportation cost or to easily handle the dust even without performing a treatment of increasing the specific volume. Since it is sealed, there is a long-term storage effect. It also has the advantage of being an inexpensive alternative fuel or auxiliary fuel when, for example, the price of coal rises.

However, in this way, shredder dust (ASR) derived from waste automobiles had a preferable situation to be useful as a material and was particularly suitable for "fibrous dust". The "shredder dust treatment method" of Patent Literature 1 had a problem that the metal scraper had a low processing ability (up to 1.5 tons/hour) which cannot meet the initial investment and cannot expand the installable area.

ASR to be treated usually contains 3 to 4% of combustible chlorine and 3 to 5% of copper which is a catalyst for dioxin generation. The present situation is that since waste plastic, waste wood, waste paper, and paper sludge not containing polyvinyl chloride 5 to 10 times the amount of untreated ASR are added to the ASR in order to dilute these concentrations, it is very rudimentary and groundless processing to reduce the content of combustible chlorine and copper contained in ASR. However, since this method of adding waste plastic to ASR only adds "industrial waste" to "industrial waste", the quality of the final product was not stable. Since many combustible chlorine contents exceeded 1%, there was a problem of receiving a claim from the delivery destination that it could not be adopted as an auxiliary fuel. To send back RPF made by mixing ASR and waste plastic sent from Kanto to Hokkaido again to Tokyo has a problem that shredders financially have to pay double fares. In addition to this problem, there was also a problem that double transportation increases the $CO_2$ emissions of the trailer corresponding to single transportation.

The invention has been made to fundamentally solve such a problem. That is, an object of the invention is to provide a treatment method capable of using a total amount of industrial wastes called "fibrous dust" or "particulate dust", which are simply organic residues of shredder dust in the past, as resources again and a treatment device capable of improving its treatment capacity.

[Means for Solving the Problems]

A shredder dust treatment method of the invention is a shredder dust treatment method of serially crushing shredder dust obtained by crushing wastes such as waste automobiles, waste home appliances, and waste office furniture a plurality of times by following treatment steps, gradually decreasing a particle size of the shredder dust, separating a valuable material such as metal and non-ferrous metal from the crushed material, further collecting metal scraps, and processing the remaining residue into a useful industrial material.

(1) A first crushing step (S1),
(2) a step of separating and collecting fibrous dust from a first crushed material (S2),
(3) a step of separating and collecting metal from the first crushed material (S3, S4, S5),
(4) a step of separating and collecting fibrous dust from the first crushed material (S6),
(5) a second crushing (shredding) step (S7),
(6) a step of separating and collecting fibrous dust from a second crushed material (S8, S9),
(7) a third crushing (pulverizing) step (S10),
(8) a step of separating and collecting fibrous dust and particulate dust from a third crushed material (a pulverized material) (S11),
(9) a step of separating metal from the third crushed material (the pulverized material) (S12, S13, S31, S32),
(10) a step of solidifying, carbonizing, sealing, and fueling fibrous dust, and
(11) a step of solidifying, desalinating, carbonizing, sealing, and fueling particulate dust.

A shredder dust treatment method of the invention is a shredder dust treatment method of further collecting metal scraps from a residue (shredder dust) in which valuable materials such as metal and non-ferrous metal are separated from a material obtained by crushing wastes such as waste automobiles, waste home appliances, and waste office furniture and processing a remaining residue into a useful industrial material, including:

a crushing step (S1) of crushing the wastes into a predetermined size;
a primary dust collecting step (S2) of collecting "fibrous dust" separated by the crushing step (S1);
an iron component separation and collection step (S3) of separating and collecting a magnetic material containing an iron component in a crushed material obtained by the crushing step (S1);
a non-ferrous component separation and collection step (S4) of using a homopolar magnet to separate and collect a non-ferrous component which is not picked up by a magnetic force and is contained in the crushed material separated by the iron component separation and collection step (S3);
a step (S5) of separating and collecting stainless steel which is not separated by the non-ferrous component separation and collection step (S4) and is discharged while being contained in non-metal by the combination of a metal detector and an air jet nozzle of ejecting jet air;
a wind power sorting step (S6) of sorting the crushed material separated by the metal component separation and collection step (S5) into lightly floating "fibrous dust" and a settled crushed material;
a shredding step (S7) of shredding "particulate dust" separated by settling in the wind power sorting step (S6) into a predetermined size;
a secondary dust collecting step (S8) of collecting the "fibrous dust" generated by the shredding step (S7);
a stirring step (S9) of separating the "fibrous dust" and the "particulate dust" shredded and crushed by the shredding step (S7) while tapping the dust in a metering feeder by a stirring blade; and
a fibrous dust/particulate dust separation step (S11) of separating the crushed material shredded by the shredding step (S7) into "fibrous dust" and "particulate dust",
wherein the "fibrous dust" generated when being separated by each of the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) is collected, and
wherein the "particulate dust" separated by the fibrous dust/particulate dust separation step (S11) is collected.

The shredder dust treatment method further includes:

a treatment step of mixing the "fibrous dust" generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) with a chlorine neutralizer such as quicklime or hypo and solidifying the mixture into about a thumb size by a compressing/molding machine called a pelletizer or a charcoal production machine in order to use the fibrous dust as household service fuel.

The shredder dust treatment method further includes:

a briquette pressing step (S213) of highly compressing the "fibrous dust" generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) and solidifying the fibrous dust into a predetermined size in order to produce household service/industrial fuel as a substitute for coal; and a sealing step (S214) of sealing the "fibrous dust" in a briquette state solidified by the briquette pressing step (S213).

The shredder dust treatment method further includes:

a lignin mixing step (S215) of adding lignin to the "fibrous dust" generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11);

a carbonization step (S216) of solidifying the mixture at a high pressure by the briquette pressing step (S213) and carbonizing the mixture; and a sealing step (S214) of sealing the mixture to produce a coke product.

The shredder dust treatment method further includes:

an organic/inorganic mixing step (S218) of mixing an inorganic material such as clay, sand, slag, and soil, glass, and pottery derived from ASR with the "fibrous dust" generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) in addition to iron powder or mill scale;

a briquette pressing step (S213) of highly compressing the "fibrous dust" mixed with iron powder, mill scale, clay, sand, slag, and soil, glass, and pottery derived from ASR by the organic/inorganic mixing step (S218) and solidifying the fibrous dust into a predetermined size to produce a defoamer used in a converter; and a sealing step (S214) of sealing the "fibrous dust" changed into the briquette state by the briquette pressing step (S213).

The shredder dust treatment method further includes:

a briquette pressing step (S213) of highly compressing the "fibrous dust" generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) and solidifying the fibrous dust into a predetermined size;

an iron rod inserting step (S219) of inserting an iron rod into the "fibrous dust" in the briquette state solidified by the briquette pressing step (S213) in a longitudinal direction thereof; and a sealing step (S214) of sealing the "fibrous dust" in the briquette state into which the iron rod is inserted by the iron rod inserting step (S219).

The shredder dust treatment method further includes:

a pulverization step (S2110) of pulverizing the "fibrous dust" separated and collected by the fibrous dust/particulate dust separation step (S11); and a particle classifying/classifying step (S2111) of performing a particle classifying/classifying process on the "fibrous dust" pulverized by the pulverization step (S2110) into several stages.

The shredder dust treatment method further includes:

an optical color sorting step (S311) of sorting aluminum scrap from the "particulate dust" separated and collected by the fibrous dust/particulate dust separation step (S11);

an aluminum/polyvinyl chloride separation step (S312) of conveying "particulate dust" changed to have similar properties to those of the "fibrous dust" by eliminating the aluminum scrap from the "particulate dust" by the optical color sorting step (S311) and eliminating polyvinyl chloride by a near infrared sensor attachment sorting device to a "fibrous dust" accumulation site;

a briquette pressing step (S313) of highly compressing the "particulate dust" from which aluminum or polyvinyl chloride is eliminated by the aluminum/polyvinyl chloride separation step (S312) and solidifying the particulate dust into a predetermined size;

a carbonization step (S314) of desalinating the "particulate dust" changed into a briquette state by the briquette pressing step (S313) while carbonizing the particulate dust; and a sealing step (S316) of sealing the "particulate dust" carbonized by the carbonization step (S314) in an artificial casing.

The shredder dust treatment method further includes:

a lignin mixing step (S317) which is provided between the aluminum/polyvinyl chloride separation step (S312) and the briquette pressing step (S313) to add lignin corresponding to industrial waste discharged from a paper making company in plastic, rubber, wood chips, and the like heavier than "fibrous dust".

The sealing step (S214, S316) can be a vacuum sealing step of performing a sealing process in a vacuum state.

A shredder dust treatment method of using the shredder dust treatment method according to claim 1 or 2 for a treatment of crushing and sorting a coated copper wire using paper, iron, copper, aluminum, rubber, polyvinyl chloride, and other plastic materials corresponding to contents of ASR as a conducting material, an insulating material, a coating material, and a reinforcing material in waste automobiles, waste home appliances, and waste office furniture.

A shredder dust treatment device of the invention is a shredder dust treatment device for sorting metal, non-ferrous metal, and non-metal from shredder dust obtained by crushing wastes such as waste automobiles, waste home appliances, and waste office furniture and collecting a useful material, including:

a crusher (10) which crushes the wastes into a predetermined size;

a vibration type dust collector (20) which separates "fibrous dust" from a crushed material crushed by the crusher (10);

an iron component separation and collection device (30, 40) which separates and collects an iron component from the crushed material from which the "fibrous dust" is separated by the vibration type dust collector (20);

a non-ferrous component separation and collection device (50) which separates and collects a non-ferrous component of the crushed material separated by the iron component separation and collection device (30, 40);

a metal detector attachment sorter (60) which sorts metal components mainly including as stainless steel and wire harness in the crushed material separated by the non-ferrous component separation and collection device (50) by using air jet ejected from a nozzle;

a wind power sorting device (70) which sorts the crushed material sorted by the metal detector attachment sorter (60) into "fibrous dust" floating by using wind power and a settled crushed material;

a shredding machine (80) which shreds the crushed material separated by settling in the wind power sorting device (70) into a particle size of 8 mm or less;

a vibration type dust collector (20) which separates "particulate dust" and "fibrous dust" containing a large amount of copper wire or polyvinyl chloride from the crushed material shredded into a predetermined size by the shredding machine (80); and a metering feeder (90) which separates "fibrous dust" from "particulate dust" of the crushed material from which a copper component is separated by the vibration type dust collector (20).

The vibration type dust collector (20) includes:

a supply port (201) which supplies a crushed material pulverized by the crusher (10), a suction pipeline (202) which is disposed toward a top of the supply port (201), a disturbing member (203) which is provided in the course of the suction pipeline (202) to disturb the suction of the crushed material other than "fibrous dust", a zigzag pipeline (204) which is disposed toward a bottom of the supply port (201) and includes a plurality of bends in a pipeline, and vibration generation means (205) for vibrating the entire device.

The vibration type dust collector (20) can be further provided with an ultrasonic wave irradiation device for easily separating the wire harness stuck to the porous organic material of the crushed material.

The wind power sorting device (70) includes:

a pipeline body (701) through which an air stream flows from a bottom to a top, an inlet (703) which opens to a top of a branch pipeline (702) provided in the course of the pipeline body (701) and through which the crushed material is input, a rotation blade (704) which is attached between the inlet (703) and the branch pipeline (702) to keep air-tightness of the pipeline body (701), an upper discharge port (706) which discharges "fibrous dust" to an upper portion of the pipeline body (701), and a lower discharge port (705) which discharges a settled crushed material like "particulate dust" to a lower portion.

The metering feeder (90) includes:

a cylindrical body (902) which has a cylindrical shape and includes a high-speed stirring blade (901a) and a low-speed stirring blade (901b) provided as two upper and lower stages at a lower portion and rotating horizontally, an inlet (903) which is provided in a periphery or an upper portion of the cylindrical body (902) and through which a crushed material is input, an upper discharge port (904) which is provided on a side opposite to the inlet (903) of the cylindrical body (902) to open upward and discharges "fibrous dust" having a light weight in the crushed material, a lower discharge port (905) which is provided in a periphery or a lower portion of the cylindrical body (902) and discharges a crushed material heavier than the separated fibrous dust, and a partition plate (906) which is provided between the inlet (903) for a crushed material and the upper discharge port (904) for fibrous dust of the cylindrical body (902) so that dust heavier than fibrous dust is not sucked from the upper discharge port (904), wherein the high-speed stirring blade (901a) rotates at a high speed as compared with the low-speed stirring blade (901b) at the lower portion and "fibrous dust" is separated from "particulate dust" heavier than "fibrous dust" while the dust is tapped by the high-speed stirring blade (901a).

The shredder dust treatment device further includes:

a device which inserts mill scale corresponding to iron scraps containing an iron component and falling off from a surface in a rolling step or the like of a steel plant into an artificial casing by pushing the mill scale thereinto using a briquette pressing machine and a sealing device and has a combination of a screw conveyor provided in a vertical shaft to insert a material and a pusher provided in a horizontal shaft only to insert mill scale falling off while being pushed by the screw conveyor so that the mill scale is inserted into an artificial casing or an empty can.

[Effects of the Invention]

Since the shredder dust treatment method and the shredder dust treatment device of the invention are a method and a device that perform a treatment by using a device sucking only "fibrous dust" having a volume five times or more other types of dust in all of crushing, shredding, and sorting steps (devices) of the related art, it is possible to largely decrease the amount of "fibrous dust" in a pulverizing step (S10), a turbo mill (100), a separation step (S11), or an air table (120). Accordingly, it is possible to improve the treatment capacity of the entire plant by about four times or more as compared with the related art without increasing the size of the plant even when the type of device of each of the shredding, pulverizing, and separating steps of the related art is changed to a more efficient type.

"Fibrous dust" can be used as a fuel for a thermal power plant, as a reducing agent for blast furnaces and electric furnaces, and as a defoamer for converters as soon as the dust passes through steps of solidification, sealing, and raising the bulk density. "Particulate dust" can be also processed into various valuable materials as in "fibrous dust" without making a big investment to "particulate dust" just disposed in the past as a treatment method by using an optical sensor attachment aluminum sorter or a near infrared sensor attachment polyvinyl chloride separator or adding a carbonization step and a desalination step.

Since the shredder dust treatment method of the invention can be directly used in a plant that crushes and sorts coated copper wires using the contents of ASR such as paper, iron, copper, aluminum, rubber, polyvinyl chloride, and other plastic materials in waste automobiles, waste home appliances, and waste office furniture as the conducting material, the insulating material, the coating material, and the reinforcing material, its versatility is high.

In the fueling line of the shredder dust treatment device of the invention, since there is a sealing step for the artificial casing, there is no need to invest in machinery for the process of separately using high temperature or applying high pressure to solidify or there is no need to spend running costs for operating it.

When ASR derived products produced by the shredder dust treatment device of the invention are used as fuel or reducing agents in electric furnaces that exceed the blast furnaces by the number of facilities compared to the blast furnaces and the converters, the ASR can be consumed even when the ASR does not go to local production and local consumption sites. Accordingly, the transportation distance involved with the national scale ASR will be shorter. The shortening of the transportation distance has the effect of reducing the $CO_2$ emitted during the transportation process.

In addition, according to a calculation by Japanese public agencies, it is possible to expect about 11% reduction in $CO_2$ emissions simply by replacing 50% of the amount of coke used in the electric furnace with waste plastic. There are also various products that use ASR derived "fibrous dust" and "particulate dust" that have polyurethane as a main component produced according to the invention. Further, since "fibrous dust" and "particulate dust" from which polyvinyl chloride has been eliminated are carbon-free fuels, they have the effect of reducing $CO_2$ emissions. Therefore, even if carbon tax is introduced in the future, carbon tax may not be paid. Secondary benefits that can be accepted in the future can be also expected.

Since the ASR derived product produced by the shredder dust treatment device of the invention has very low contamination of chlorine (around 0.5%) and copper, the amount of dioxin generated is extremely low compared to when ASR is directly used in blast furnaces, electric furnaces, and converters. As a result, when the fuel, reducing agent, and defoamer produced by the invention are used in the steel making process, the monitoring system for dioxin and chlorine and copper content will be much simpler than before. Lowering the chlorine content (such as polyvinyl chloride) contained in the materials input to the blast furnace, converter, and electric furnace as much as possible not only eliminates the need for excess dioxin treatment facilities, but also reduces the cost of replacing and treating the desalting agent. Creating high-quality ASR derived organic products is a technology system that achieves not only environmental load reduction but also publicity, wide area, and convenience.

By passing the mixed waste of polyurethane, plastic, and cloth which are currently discharged as industrial waste and simply incinerated and landfilled through the crushing, sorting, and dust absorption treatment steps of the invention together with the input material of the invention, final combustible chlorine content of "fibrous dust" can be reduced to 0.3% or less (equivalent to RPF A product).

DETAILED DESCRIPTION OF THE INVENTION

A shredder dust treatment method of the invention is a treatment method of crushing wastes such as waste automobiles, waste home appliances, and waste office furniture, separating organic residue remaining after extracting valuable materials such as copper, aluminum, or iron from residue (shredder dust) obtained by eliminating valuable materials such as metal scraps into two types of "fibrous dust" and "particulate dust", and reusing them as useful industrial resources.

First Embodiment

Figure 1:
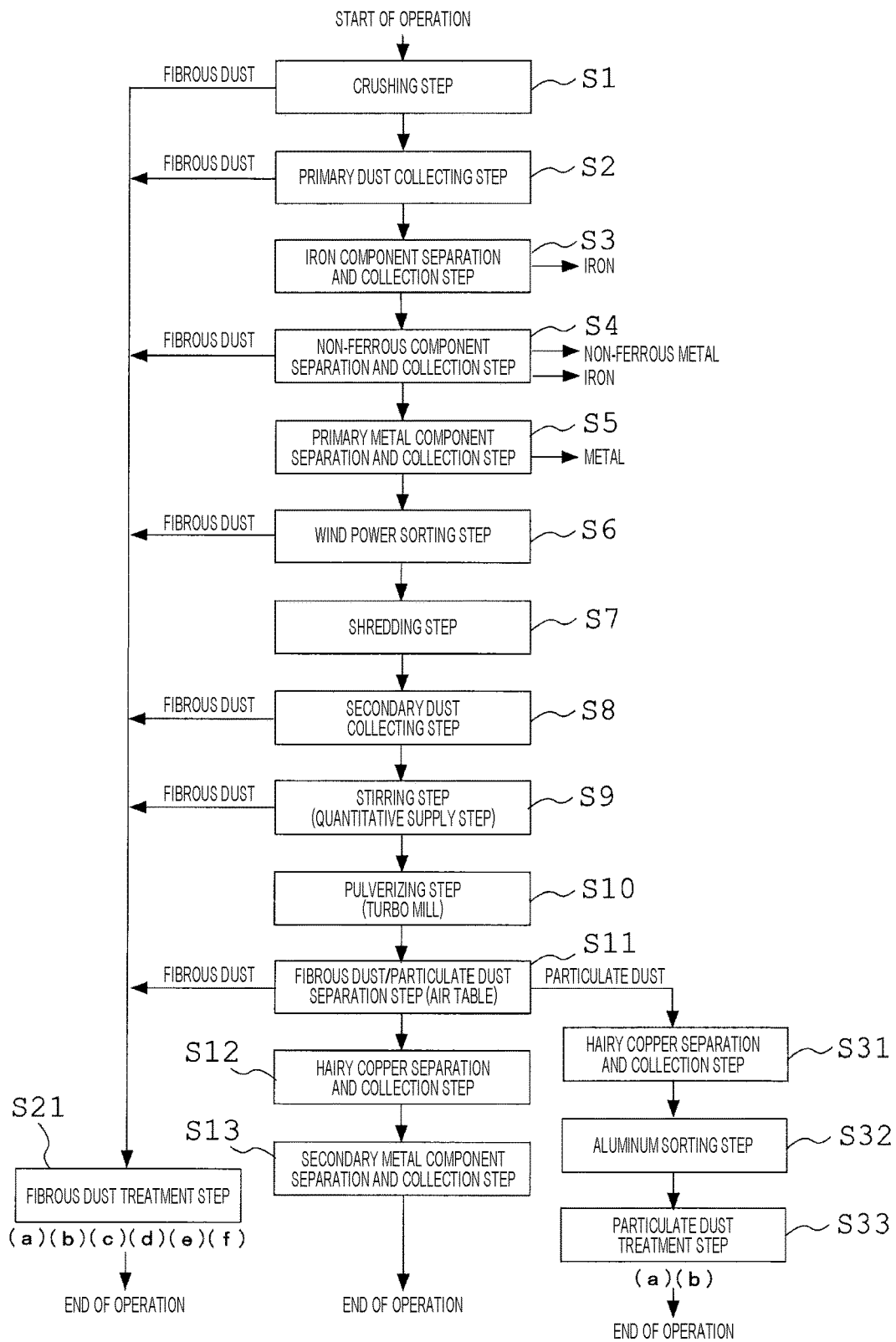
FIG. 1 is a working flowchart showing a basic embodiment of a shredder dust treatment method of a first embodiment.

FIG. 1 is a working flowchart showing a basic embodiment of a shredder dust (ASR or SR) treatment method of a first embodiment.

A shredder dust treatment method of the first embodiment is to crush wastes such as waste automobiles, waste home appliances, and waste office furniture, sort valuable materials such as metal and non-ferrous metal from the crushed material, and change organic residue (non-metal scraps) generally corresponding to industrial waste into useful materials.

<Main Treatment Line of Shredder Dust Treatment Method>

A shredder dust treatment method of the first embodiment includes the following treatment steps. This method is a treatment method which mainly includes a crushing step (S1), a primary dust collecting step (S2), an iron component separation and collection step (S3), a non-ferrous component separation and collection step (S4), a metal component separation and collection step (S5), a wind power sorting step (S6), a shredding step (S7), a secondary dust collecting step (S8), and a step (S11) of mainly separating copper but also separating "fibrous dust" and "particulate dust" corresponding to a main raw material used for fueling.

This treatment method is a treatment method which mainly includes first, second, and third treatment steps. This treatment method is a treatment method of performing a plurality of serial crushing operations, gradually decreasing the particle diameter of the shredder dust, separating valuable materials such as metal and non-ferrous metal from the crushed material, collecting metal scraps, and processing the remaining residue into useful industrial materials.

As the first treatment step, (1) a first crushing step (a crushing step (S1)), (2) a step (a primary dust collecting step (S2)) of separating and collecting fibrous dust from a first crushed material, (3) a step (an iron component separation and collection step (S3), a non-ferrous component separation and collection step (S4), and a metal component separation and collection step (S5)) of separating and collecting metal from the first crushed material, and (4) a step (a wind power sorting step (S6)) of separating and collecting fibrous dust from the first crushed material are provided.

As the second treatment step, (5) a step (a shredding step (S7)) of performing a second crushing (shredding) process and (6) a step (a secondary dust collecting step (S8) and a stirring step (S9)) of separating and collecting fibrous dust from the second crushed material are provided.

As the third treatment step, (7) a step (a pulverizing step (S10)) of performing a third crushing (pulverizing) process, (8) a step (a fibrous dust/particulate dust separation step (S11)) of separating and collecting fibrous dust and particulate dust from the third crushed material (the pulverized material), and (9) a step (a hairy copper separation and collection step (S12), a secondary metal component separation and collection step (S13), a hairy copper separation and collection step (S31), and an aluminum sorting step (S32)) of separating metal from the third crushed material (the pulverized material) are provided.

Further, as will be described later, this includes a treatment method of processing a remaining residue into a useful industrial material.

(10) A step of solidifying, carbonizing, sealing, and fueling fibrous dust and (11) a step of solidifying, desalinating, carbonizing, sealing, and fueling particulate dust are provided.

The crushing step (S1) is a treatment step of crushing wastes such as waste automobiles, waste home appliances, and waste office furniture. In the crushing step (S1), wastes such as waste automobiles, waste home appliances, and waste office furniture are crushed by using a crusher (10) to be described later. The particle diameter of the crushed material (the shredder dust) is set to 25 mm or less. "Fibrous dust" of light weight generated at this time is sucked and collected. In the treatment method of the first embodiment, the crushed material, for example, the crushed material (the shredder dust) is conveyed to the next step by using the same conveyor as the screw conveyor. "Fibrous dust" of light weight in the crushed material is conveyed to the next step by an air conveying operation using, for example, a pipeline so that floating dust in a factory is reduced as much as possible.

In the crushed material which is treated in the crushing step (S1), "fibrous dust" is mainly sucked by the next primary dust collecting step (S2). In the primary dust collecting step (S2), the crushed material in the crushing step (S1) is separated into floating "fibrous dust" and a crushed material (particulate dust) heavier than "fibrous dust" by using, for example, a vibration type zigzag pipeline attachment dust collector (20). The crushed material from which several % of "fibrous dust" in weight ratio is separated is conveyed to the next step. The primary and secondary terms mean the order of the processes in the same treatment steps. The same applies to the following.

The crushed material which is treated in the primary dust collecting step (S2) is treated in the next iron component separation and collection step (S3). In the iron component separation and collection step (S3), an iron component is separated and collected from the crushed material in the primary dust collecting step (S2) by using, for example, a suspended magnetic separator attachment vibration conveyor (30) (see FIG. 6). Further, an iron component is separated and collected from the crushed material of the primary dust collecting step (S2) by using a magnet drum A (40) (see FIG. 6). The crushed material from which an iron component is separated is conveyed to the next step.

The crushed material which is treated in the iron component separation and collection step (S3) is treated in the next non-ferrous component separation and collection step (S4). In the non-ferrous component separation and collection step (S4), a non-ferrous component and an iron component are further separated and collected from the crushed material from which an iron component is separated in the crushing step (S1). The light "fibrous dust" generated at this time is sucked and collected. The crushed material from which the non-ferrous component is separated is conveyed to the next step.

The crushed material which is treated in the non-ferrous component separation and collection step (S4) is treated in the next primary metal separation and collection step (S5). In the primary metal separation and collection step (S5), stainless steel or wire harness which is mainly recognized as metal and cannot be separated by the automatic non-ferrous separator is sorted and collected by, for example, a metal detector attachment sorter (an air jet type) (60) (see FIG. 6) to be described later. The crushed material from which stainless steel or wire harness is sorted and collected is conveyed to the next step. A purpose of separating stainless steel is to protect the blade of the crushing machine of the shredding step (S7) from chipping and premature wear.

The crushed material which is treated in the primary metal separation and collection step (S5) is treated in the next wind power sorting step (S6). In the wind power sorting step (S6), the crushed material (particulate dust) which does not float and is heavier than "fibrous dust" to thereby settle down and floating "fibrous dust" are separated and collected by using, for example, a V-shaped wind power sorting device (70) (see FIG. 6) to be described later. The crushed material from which "fibrous dust" is separated to some extent is conveyed to the next step.

The crushed material which is treated in the wind power sorting step (S6) is treated in the next shredding step (S7). In the shredding step (S7), the crushed material which is separated to settle down by the wind power sorting step (S6) is shredded into a predetermined size. The particle diameter after the crushing operation is 8 mm or less. The crushed material which is shredded into a predetermined size is conveyed to the next step.

The crushed material which is treated in the shredding step (S7) is treated in the next secondary dust collecting step (S8). In the secondary dust collecting step (S8), heavy dust and floating fibrous dust are separated from the crushed material obtained in the crushing step (S1) of separating the crushed material shredded in the shredding step (S7) into "fibrous dust" and "particulate dust" by using, for example, the above-described vibration type zigzag pipeline attachment dust collector (20), so that "fibrous dust" is separated and collected. The crushed material from which several % of "fibrous dust" in weight ratio is separated is conveyed to the next step. Since the specific gravity of "fibrous dust" is ⅕ or less of "particulate dust", fibrous dust which is five times the volume of "particulate dust" is sucked.

The crushed material which is treated in the secondary dust collecting step (S8) is treated in the next stirring step (S9). In the stirring step (S9), for example, the crushed material (particulate dust) formed as lumps in the secondary dust collecting step (S8) is dissolved by using a metering feeder (90) (see FIG. 6) and "fibrous dust" generated when the crushed material is input to the metering feeder (90) or is stirred is caused to float. Fibrous dust which floats at that time is separated so that several % of "fibrous dust" is separated and collected. The dispersed debris (particulate dust rich material) is conveyed to the next step. Furthermore, since the stirring step (S9) uniformly discharges debris (particulate dust rich material) at a constant amount, this step is also referred to as a quantitative supply step.

The crushed material which is treated in the stirring step (S9) is treated in the next pulverizing step (S10). In the pulverizing step (S10), the crushed material (particulate dust) which is dispersed in the stirring step (S9) by using, for example, the turbo mill is pulverized and the generated "fibrous dust" is caused to float. The pulverized crushed material (particulate dust) is conveyed to the next step.

The next step of the pulverizing step (S10) is the fibrous dust/particulate dust separation step (S11) of separating "fibrous dust" and "particulate dust" from each other. In the fibrous dust/particulate dust separation step (S11), the remaining "fibrous dust" which cannot be separated in the treatment steps by using, for example, a large air table (120) (see FIG. 6) to be described later is separated and collected and "particulate dust" is collected while being separated from a copper component. The crushed material from which the "fibrous dust" and the copper component are separated is conveyed to the next step.

The crushed material which is treated in the fibrous dust/particulate dust separation step (S11) is treated in the next hairy copper separation and collection step (S12). In the hairy copper separation and collection step (S12), a thin copper wire having a diameter of 0.5 mm or less called hairy copper and largely remaining in "particulate dust" is separated and collected by using a hairy copper separation circular vibration sieve (130) (see FIG. 6). The crushed material from which the hairy copper is separated is conveyed to the next step.

The crushed material which is treated in the hairy copper separation and collection step (S12) is treated in the next secondary metal component separation and collection step (S13). In the secondary metal component separation and collection step (S13), a magnetic material (mainly stainless SUS304 or delicate iron fragments having a diameter of 5 mm or less) is collected while being separated from the copper wire by using a magnet drum B (140). By this treatment, the operation of the main treatment line of the shredder dust ends.

"Fibrous dust" which is separated and collected in the crushing step (S1), the primary dust collecting step (S2), the non-ferrous component separation and collection step (S4), the wind power sorting step (S6), the secondary dust collecting step (S8), and fibrous dust/particulate dust separation step (S11) is treated by a "fibrous dust" treatment step (S21) to be described later. The "fibrous dust" is mainly a porous polyurethane resin containing aluminum dust in air bubbles (see Table 1).

Further, "fibrous dust" which is separated and collected in the fibrous dust/particulate dust separation step (S11) is treated by a hairy copper separation and collection step (S31), an aluminum sorting step (S32), and a "particulate dust" treatment step (S33) to be described later. The "particulate dust" is mainly rubber, wood, heavy hard plastics, cable coverings containing polyvinyl chloride, and the like.

<"Fibrous Dust" and "Particulate Dust">

"Fibrous dust" is a material with a high content of aluminum as shown in the metal element analysis table of Table 1. The next highest content rate is iron. In contrast, the copper content is very low. That is, "fibrous dust" which has a high content of aluminum and iron among polyethylene and metal elements will have very suitable properties as a reducing agent (deoxidizing material) for blast furnaces and electric furnaces as it is. This elemental metal analysis is a measurement result obtained by a company specializing in analysis by a qualitative analysis method using an X-ray fluorescence analyzer.

TABLE 1

X-RAY FLUORESCENCE ANALYSIS
(QUALITATIVE ANALYSIS $^{92}$U TO $^{11}$Na)

| RELATIVE AMOUNT | DETECTED ELEMENTS |
|---|---|
| ♯ VERY MUCH | Al |
| ♯ MUCH | Fe |
| ♯ MODERATE | Zn, Si, Mg |
| + LITTLE | Sn, Ag, Cl, S, P |
| (+) VERY LITTLE | Zr, Cu, Ni, Mn, Cr, V, Ti, Ca, K |

"Particulate dust" is a material that is heavier than polyurethane, plastic, and the like and is made of rubber, wood chips, sheet materials, wire coverings materials, polyvinyl chloride, aluminum, and the like. After polyvinyl chloride for generating combustible chlorine is eliminated or chlorine in the constituents of polyvinyl chloride is vaporized, charcoal or pulverized coal is produced and used by using a carbonization device using a heat source of a high frequency or a combustion of a city gas. Charcoal and pulverized coal can be used as a substitute fuel for coal and pulverized coal used in thermal power plants and municipal incinerators, as a reducing agent for blast furnaces and electric furnaces, or as a raw material for gasification reforming furnaces.

<"Fibrous Dust" Treatment Line of Shredder Dust Treatment Method>

Figure 2:
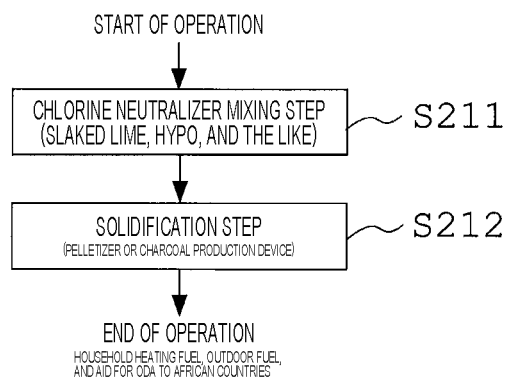
FIG. 2 is a working flowchart showing a "fibrous dust" treatment line of the shredder dust treatment method of the first embodiment, where (a) shows a household service fueling treatment line, (b) shows an industrial fueling treatment line, (c) shows a coke production treatment line, and (d) shows a defoamer production treatment line.
Figure 2:
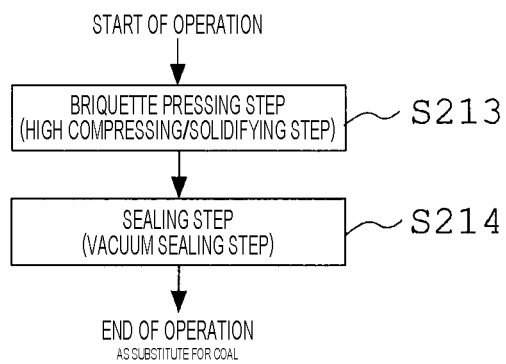
Figure 2:
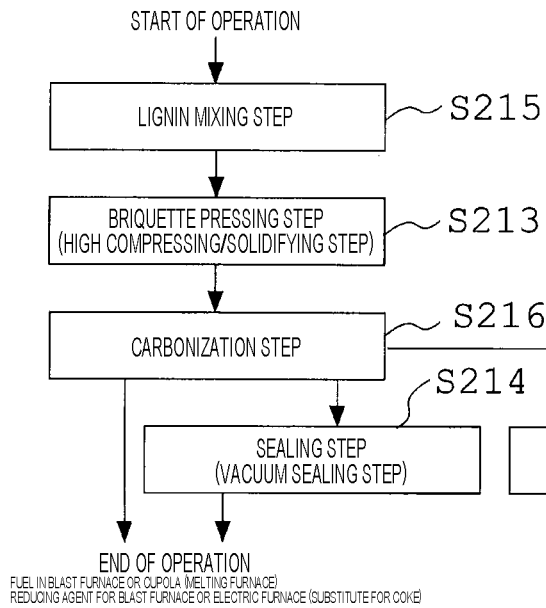
Figure 2:
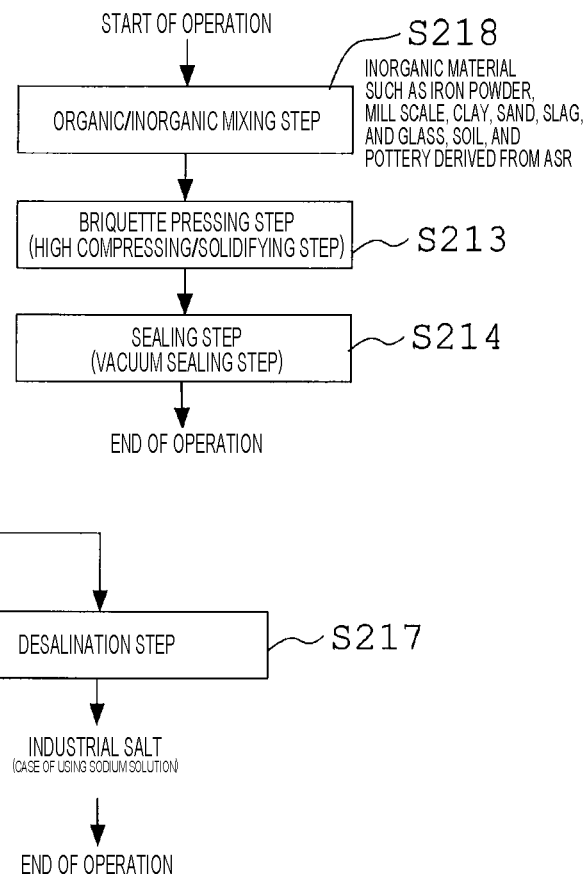
Figure 3:
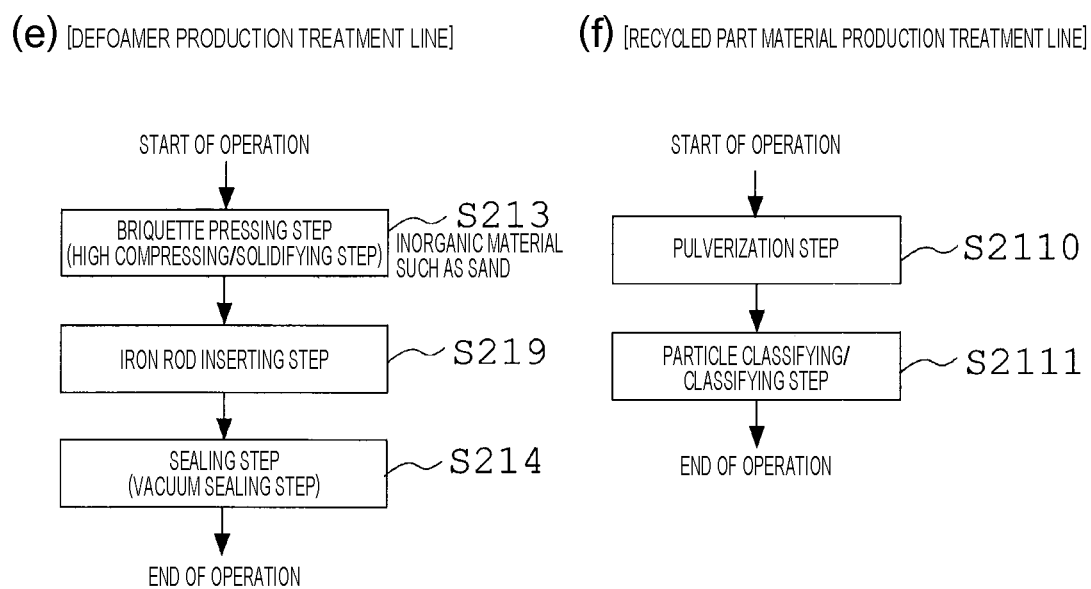
FIG. 3 is a working flowchart showing the "fibrous dust" treatment line of the shredder dust treatment method of the first embodiment, where (e) shows a defoamer treatment line and (f) shows a recycled part material production treatment line.

FIG. 2 is a working flowchart showing a "fibrous dust" treatment line of the shredder dust treatment method of the first embodiment, where (a) shows a household service fueling treatment line, (b) shows an industrial fueling treatment line, (c) shows a coke production treatment line, and (d) shows a defoamer production treatment line. FIG. 3 is a working flowchart showing a "fibrous dust" treatment line of the shredder dust treatment method of the first embodiment, where (e) shows a defoamer production treatment line and (f) shows a recycled part material production treatment line.

"Fibrous dust" which is separated by the crushing step (S1), the primary dust collecting step (S2), the non-ferrous component separation and collection step (S4), the wind power sorting step (S6), the secondary dust collecting step (S8), and the fibrous dust/particulate dust separation step (S11) is collected and is treated by the next treatment steps.

<Configuration of (a) Household Service Fueling Treatment Line>

As shown in FIG. 2(a), the household service fueling treatment line includes a chlorine neutralizer mixing step (S211) and a solidification step (S212). The chlorine neutralizer mixing step (S211) is a treatment step of neutralizing chlorine in fibrous dust using slaked lime (calcium hydroxide), hypo (sodium thiosulfate), and the like. The solidification step (S212) is a treatment step of solidifying the fibrous dust using a pelletizer, a charcoal making device, or the like so as to be easy to handle as a solid fuel.

Pellets and charcoal of "fibrous dust" generated by these treatment steps can be used as fuel for household and industrial fireplaces and outdoors. These can be used as an ODA aid to African countries that have no fuel and are desertified from converting trees into fuel.

<Configuration of (b) Industrial Fueling Treatment Line>

As shown in FIG. 2(b), the industrial fueling treatment line includes a briquette pressing step (S213) and a sealing step (S214). The briquette pressing step (S213) is a treatment step of highly compressing "fibrous dust" separated and collected by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) to become a predetermined size. The sealing step (S214) is a treatment step of sealing "fibrous dust" in a briquette state solidified by the briquette pressing step (S213). The sealing step (S214) can be set as a vacuum sealing step of performing a sealing process in a vacuum state. Briquettes of "fibrous dust" generated by these treatment steps can be used as fuel. Briquettes can also be used as a substitute for coal, and as a reducing agent for blast furnaces and electric furnaces.

<(c) Coke Production Treatment Line>

As shown in FIG. 2(c), the coke production treatment line includes a lignin mixing step (S215) of mixing "fibrous dust" with lignin (wooden material) which is unwanted by-product after using cellulose in papermaking and is discarded in large quantities from paper making companies, a briquette pressing step (S213), a carbonization step (S216), a desalination step (S217), and a sealing step (S214).

This is a treatment line that produces coke substitutes used in blast furnaces and cupolas (melting furnaces) from "fibrous dust" mixed with lignin (wooden material).

<(d) Converter Defoamer Production Treatment Line>

As shown in FIG. 2(d), the converter defoamer production treatment line includes an organic/inorganic mixing step (S218) of mixing organic/inorganic materials such as iron powder, mill scale, clay, slag, sand, and glass, soil, and pottery derived from ASR, a briquette pressing step (S213), and a sealing step (S214). This is a treatment step of mixing iron powder, mill scale, clay, sand, and glass and soil derived from ASR with "fibrous dust" separated and collected by the crushing step (S1), the non-ferrous component separation and collection step (S4), the primary dust collector (S2), the wind power sorting step (S6), the secondary dust collecting step (S8), the stirring step (S9), and the fibrous dust/particulate dust separation step (S11). The organic/inorganic mixing step (S218) is a treatment step for mixing inorganic materials such as iron powder, clay, sand, slag, and soil, glass, and pottery derived from ASR to increase bulk density. The briquette pressing step (S213) is a treatment step of highly compressing "fibrous dust" into a predetermined size. The sealing step (S214) is a treatment step of sealing "fibrous dust" in a briquette state solidified by the briquette pressing step (S213) into an artificial casing. Briquettes of "fibrous dust" generated by these treatment steps can be used as a converter defoamer.

In order to increase bulk density and perform a sealing process, there is also a method of packing "fibrous dust" into an iron pipe or can instead of an artificial casing and closing both ends although the inside cannot be made vacuum. Such a sealing method has an advantage that the sealed container itself has the effect of increasing the bulk density and hence the amount of other additives can be reduced or eliminated.

<(e) Converter Defoamer Production Treatment Line>

As shown in FIG. 3(e), the defoamer production treatment line includes a briquette pressing step (S213), an iron rod inserting step (S219), and a sealing step (S214). The briquette pressing step (S213) is a treatment step of highly compressing "fibrous dust" separated and collected by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) to become a predetermined size. The iron rod inserting step (S219) is a treatment step of opening a longitudinal hole about the "fibrous dust" in the briquette state solidified by the briquette pressing step (S213) during the briquette pressing step (S213) and inserting a commercial soft iron rod into the hole. The sealing step (S214) is a treatment step of sealing the "fibrous dust" in the briquette state solidified by the briquette pressing step (S213). Since briquettes of "fibrous dust" generated by these treatment steps can also increase the bulk density to about 1.8 to 2, the briquettes can be also used as a converter defoamer.

Instead of the sealing treatment with the artificial casing, fibrous dust with a soft iron rod inserted in a pipe or can may be filled up with both ends closed. The advantages created by the sealing method are as described in the previous section.

<(f) Recycled Part Material Production Treatment Line>

As shown in FIG. 3(f), the recycled part material production treatment line includes a pulverization step (S2110) and a particle classifying/classifying step (S2111). The pulverization step (S2110) is a treatment step of pulverizing "fibrous dust" separated and collected by the fibrous dust/particulate dust separation step (S11). The particle classifying/classifying step (S2111) is a treatment step of performing a particle classifying/classifying process on "fibrous dust" pulverized by the pulverization step (S2110) into several stages. The briquettes of "fibrous dust" generated by these treatment steps can be heated to be applied to the surface after being stretched flat to make a recycled part material such as a vacuum heat insulating material, a packing material, and a cushioning material.

<"Particulate Dust" Treatment (a) Line and Coal Production Treatment Line>

Figure 4:
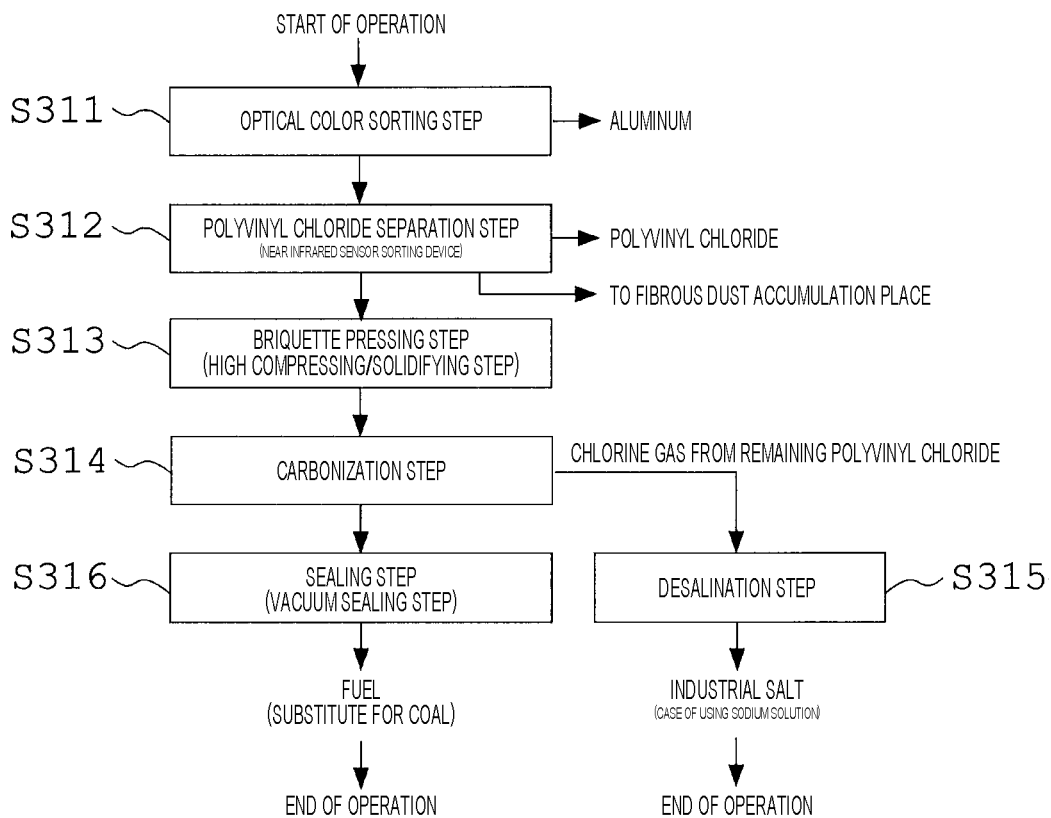
FIG. 4 is a working flowchart showing a coal production treatment line of a "particulate dust" treatment line (a) of the shredder dust treatment method of the first embodiment.
Figure 5:
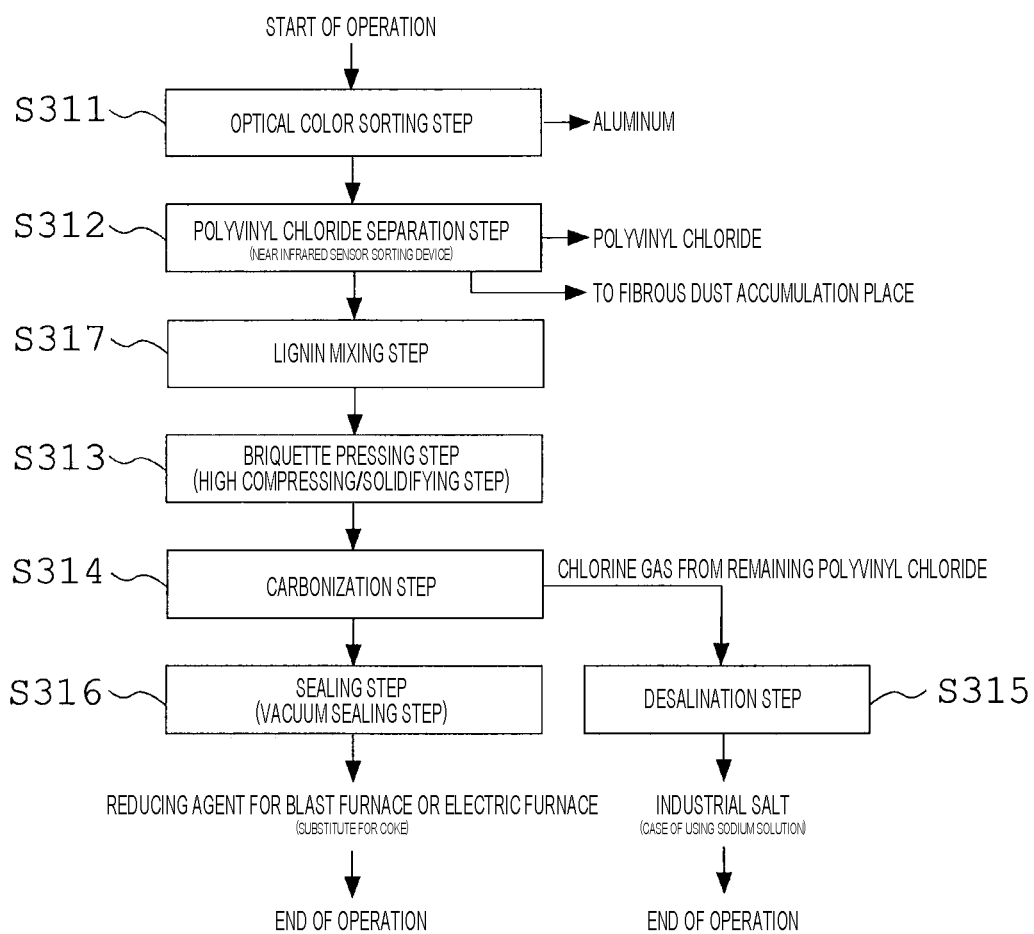
FIG. 5 is a working flowchart showing a coke production treatment line of the "particulate dust" treatment line (b) of the shredder dust treatment method of the first embodiment.

FIG. 4 is a working flowchart showing (a) a coal production treatment line of a "particulate dust" treatment line of the shredder dust treatment method of the first embodiment. FIG. 5 is a working flowchart showing (b) a coke production treatment line of the "particulate dust" treatment line of the shredder dust treatment method of the first embodiment.

"Particulate dust" of a crushed material which is heavier than "fibrous dust" and is separated by the fibrous dust/particulate dust separation step (S11) is collected and is treated in the next treatment steps. The "particulate dust" treatment line includes an optical color sorting step (S311), an aluminum/polyvinyl chloride separation step (S312), a briquette pressing step (S313), a carbonization step (S314), a desalination step (S315), and a sealing step (S316).

The optical color sorting step (S311) is a treatment step of sorting aluminum from "particulate dust" separated and collected by the fibrous dust/particulate dust separation step (S11). The aluminum/polyvinyl chloride separation step (S312) (see FIGS. 25 and 26) using a near infrared sensor is a device of separating polyvinyl chloride in fine particles of 6 mm or less by a sorting device using a near infrared sensor. The briquette pressing step (S313) is a treatment step of highly compressing "particulate dust" into a predetermined size. The carbonization step (S314) is a treatment step of easily using that dust as fuel by carbonization. The sealing step (S316) is a treatment step of sealing "particulate dust" in a briquette state solidified by the briquette pressing step (S313). By the sealing step (S316), the dust can be used as a substitute for coal. Further, the dust can be used as a reducing agent for a blast furnace or an electric furnace as a substitute for coke. The sealing step (S316) can be set as a vacuum sealing step. The treatment operation ends now.

This desalination step (S315) eliminates a chlorine gas generated in the course of the carbonization step (S314) when polyvinyl chloride is not completely eliminated by the near infrared sensor and remains in "particulate dust". In the case of a desalination device using a sodium solution, a salt combined with chlorine (NaCl) can be used as an industrial salt. The treatment operation ends now.

<"Particulate Dust" Treatment (b) Line and Coke Production Treatment Line>

The coke production treatment line of FIG. 5(b) is a line which produces coke from "particulate dust" of the heavy crushed material. This production line is the same as the coal production line except that coke is produced as a reducing agent and only a "lignin mixing step (S317)" is added between the aluminum/polyvinyl chloride separation step (S312) and the briquette pressing step (S313). The lignin mixing step (S317) is a treatment step of mixing "fibrous dust" with lignin (wooden material) which is unwanted by-product after using cellulose in papermaking and is discarded in large quantities from paper making companies.

In the shredder dust treatment method of the invention, when the number of dust collectors and the dust collecting capacity of "fibrous dust" corresponding to the biggest factor that conventionally refused to increase the treatment capacity are increased, the amount of "fibrous dust" conveyed to the fibrous dust/particulate dust separation step (S11) (the air table) can be decreased to 15 to 25%. Then, when the crusher is changed to the turbo mill, the treatment capacity of the entire plant can be increased four times while the installation area and the facility cost are maintained almost the same. As other effects, since "fibrous dust" contains a large amount of light organic combustible materials such as polyurethane and plastic, the dust can be used as a substitute for coal required as a large amount and can be also used as a reducing agent for a blast furnace or an electric furnace or a defoamer for a converter. In this way, this dust can be used as new fuel resources for a household or industrial purpose required with a large demand. When "particulate dust" containing a large amount of rubber, plastic, or wood chips is subjected to a desalinating or carbonizing treatment, a use method (charcoal, pulverized coal, and coke production) more than "fibrous dust" is obtained. Furthermore, when the shredder dust is treated by this method, inorganic glass, soil, or pottery contained therein is pulverized into powder by a turbo mill and enters bubbles of polyurethane. It will eventually be a slag produced as a by-product of the steelmaking process. Since slag is already used for concrete aggregate and the like, glass, soil, pottery, and the like do not actually become a residue that requires landfill disposal.

With such a treatment method, since transportation costs to transport inorganic residues to landfill sites, vehicle purchase costs, and landfill disposal costs are not necessary, a great cost reduction effect is obtained. Further, also in the field of licensing, there is also an advantage that there is no need to separately acquire a license as a trader handling soil, sand, and glass waste.

Second Embodiment

<Configuration of Shredder Dust Treatment Device>

Figure 6:
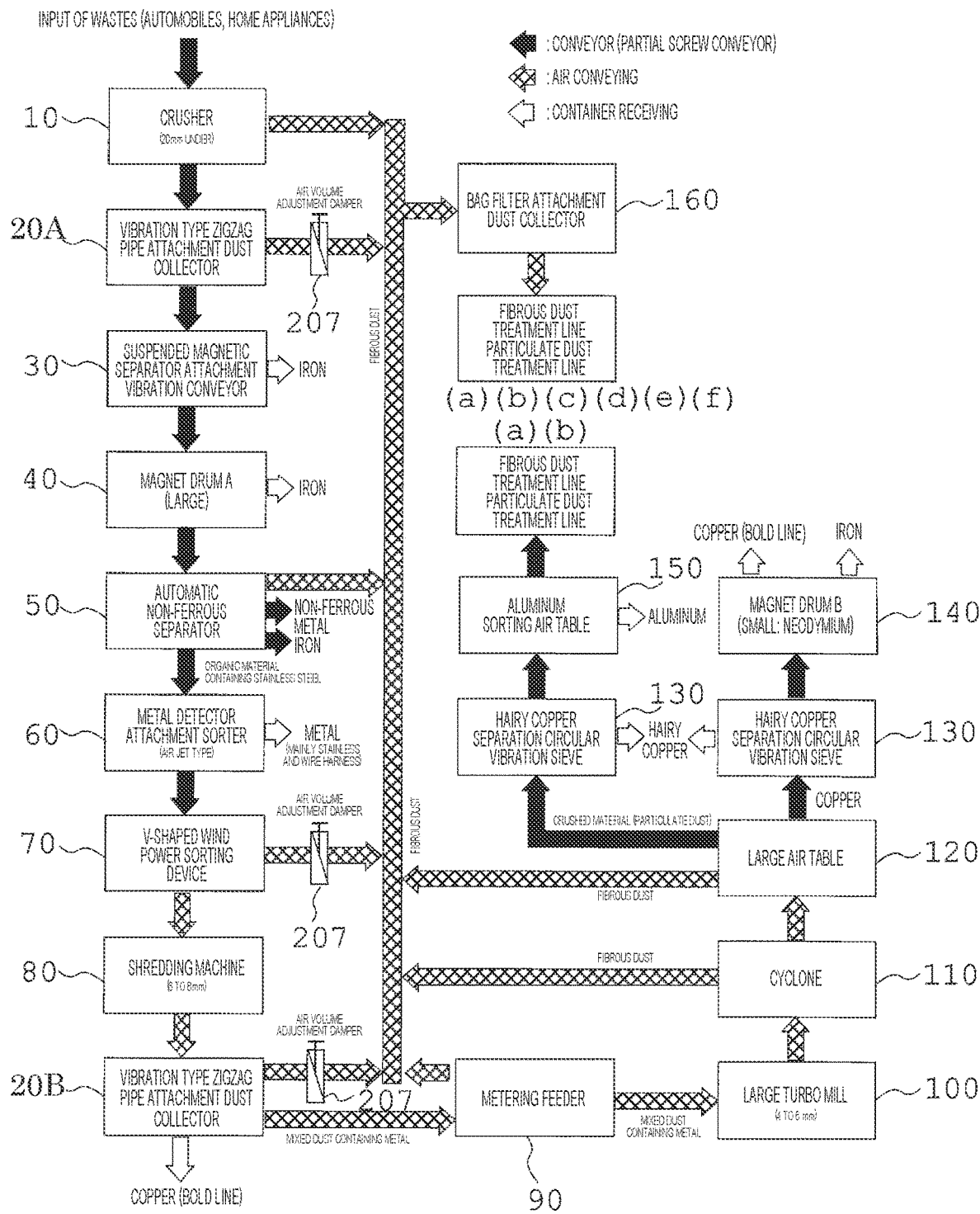
FIG. 6 is a block diagram showing a basic embodiment of a shredder dust treatment device of a second embodiment.

FIG. 6 is a block diagram showing a basic embodiment of a shredder dust treatment device of a second embodiment.

A basic embodiment of the shredder dust treatment device will be described.

The shredder dust treatment device of the second embodiment is constituted by the following devices and equipment. This treatment device mainly includes a crusher (10), a vibration type zigzag pipeline attachment dust collector (20), a suspended magnetic separator attachment vibration conveyor (30), a magnet drum A (40), an automatic non-ferrous separator (50), a metal detector attachment sorter (60) (of an air jet type), a V-shaped wind power sorting device (70), a shredding machine (80), a vibration type zigzag pipeline attachment dust collector (20), and a metering feeder (90). The above-described devices are arranged in this order.

Further, a large turbo mill (100), a cyclone (110), and a large air table (120) are sequentially arranged after the metering feeder (90). Those containing a copper component after the large air table (120) sequentially pass through a hairy copper separation vibration sieve (130) and a magnet drum B (140) (small neodymium). Meanwhile, those containing a pulverized material (particulate dust) after the large air table (120) sequentially pass through the hairy copper separation vibration sieve (130) and an aluminum sorting air table (150).

Meanwhile, "fibrous dust" which is separated and collected by the crusher (10), the vibration type zigzag pipeline attachment dust collector (20), the automatic non-ferrous separator (50), the V-shaped wind power sorting device (70), the shredding machine (80), the metering feeder (90), the cyclone (110), and the large air table (120) is collected by, for example, a bag filter attachment dust collector (160). Then, the dust is treated by the treatment devices of the "fibrous dust" treatment line to be described later.

<Configuration of Crusher>

Figure 7:
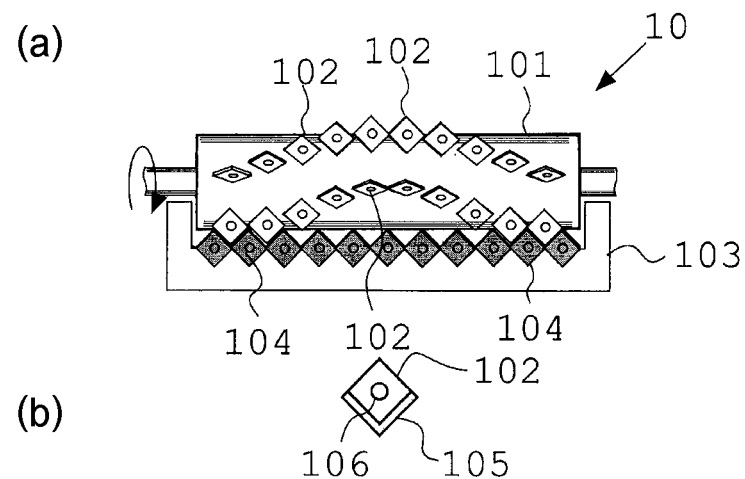
FIG. 7 is a schematic configuration view showing a rotation blade and a fixed blade of a crusher, where (a) is a front view and (b) is an enlarged view of the rotation blade and a holder.

FIG. 7 is a schematic configuration view showing a rotation blade and a fixed blade of a crusher, where (a) is a front view and (b) is an enlarged view of the rotation blade and the holder.

The crusher (10) is a treatment device which is used in the above-described crushing step (S1) and is a device for crushing waste into a predetermined size. The crusher (10) shown in the example has a rotation blade (102) attached to a single-axis rotor (101) and a fixed blade (104) attached to a main body (103). Waste disposed between the rotation blade (102) and the fixed blade (104) is crushed. As shown in the drawing, it is supposed to use a half-shaped triangular part of a large square blade. Since this rotation blade has a thickness of 25 mm, the blade can be re-polished several times by 2 to 3 mm each to a thickness of 15 mm. Since only the half Δ of the square is used for crushing, the life until polishing is also after using the diagonal ∇. That is, the life of one blade is twice as long as that of the triangular blade even if the thickness and the length of two sides and the material are the same.

Since shredder dust, especially SR from chairs of ASR and waste office furniture, is a bulky material that contains a large amount of metal as well as soft, spring-back polyurethane, and plastic along with the metal piece, it has a feature that it is a material that cannot easily increase the production volume.

The angle of the long side of the rotation blade (102) of the crusher (10) is 90° and the triangular parts of the rotation blade (102) and the fixed blade (104) are disposed to be engaged to cut or shear the material. Although the rotation blade (102) of the crusher (10) has an angle of a cut surface of the blade of 90° at which chipping is less likely to occur, since the rotation blade is attached to the holder of the rotor (101) in a downward triangular shape, the fixed blade (104) is an array of a plurality of triangular cutting edges which cut by pressing a material between the aligned triangular cutting edges.

In the crusher (10) of the invention, each rotation blade (102) is not attached in a linear shape in the longitudinal direction of the rotor (101) and is arranged in an arc shape in the longitudinal direction of the rotor (101). The rotation blade (102) at both ends of the rotor (101) in the rotation direction first engages with each fixed blade (104) having a linear shape so that a crushed material does not escape and then the rotation blade (102) at the center portion of the rotor (101) engages with each fixed blade (104) having a linear shape.

In the case of a cutting method by the crusher (10), even if the material is a soft and spring-back material such as polyurethane and plastic, a sharp end of the rotation blade (102) can roll up the soft material without escape and cut the material efficiently. Further, as compared with the conventional crusher in which the cutting edges of the rotation blade linearly arranged as in the related art and the cutting edges of the fixed blade linearly arranged in the same manner engage in parallel with each other, since the rotation blade (102) and the fixed blade (104) of the invention engage with each other in a different configuration, there is an advantage that the material can be crushed finely as compared with the conventional crusher by one cutting. Furthermore, the crushing efficiency of the input material is greatly influenced not only by the size (25 mm diameter) of the hole in the lower grid but also by the shape and size of the blade. The shape of the blade used in the invention is 80×80×25 mm in order to crush the material as finely as possible.

Since the rotation blade (102) of the crusher (10) of the invention can fix two sides of four sides of a rectangular parallelepiped shape to the inverse L-shaped holder (105) attached to the rotor (101) as shown in FIG. 7(*b*), the blade can be fixed or replaced only by one bolt (106). With such a configuration, it is possible to remarkably easily replace a cutting blade and to largely shorten the time taken for a blade positioning or replacing operation. In the conventional crusher, an operator was on the rotating rotor (101) and was performing a blade replacement operation. However, in the case of the crusher (10) used in the invention, there is an advantage that an operator can immediately and safely replace a blade while manually rotating the rotor (101) in a platform appearing when the operator opens a housing. This is useful for maintenance after installation.

Since SR including ASR contains many hard metal pieces such as stainless steel and alloy steel, it is better to be 90° so that the cutting edge is not easily chipped (that is, it does not fly). To easily replace the fixed blade or the rotation blade which is frequently replaced is a very important factor in the crusher maintenance.

<Configuration of Vibration Type Zigzag Pipeline Attachment Dust Collector>

Figure 8:
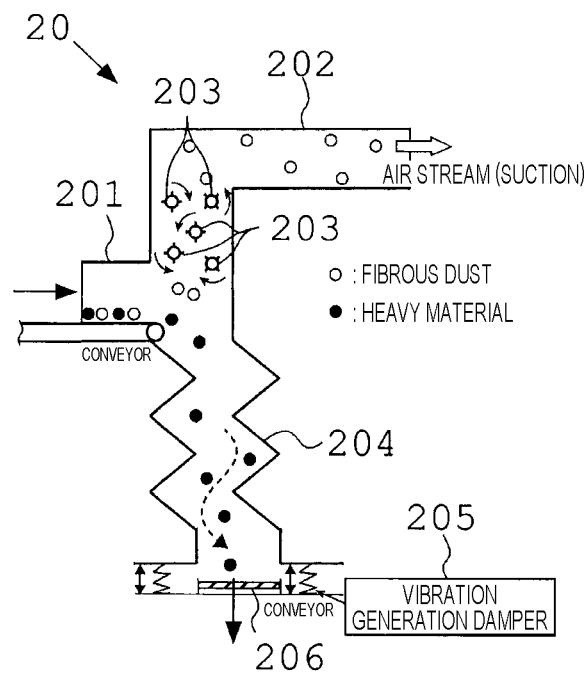
FIG. 8 is a schematic configuration cross-sectional view showing a vibration type zigzag pipeline attachment dust collector.

FIG. 8 is a schematic configuration cross-sectional view showing a vibration type zigzag pipeline attachment dust collector.

The vibration type zigzag pipeline attachment dust collector and the vibration type dust collector (20) are devices which are used in the above-described fibrous dust/particulate dust separation step (S11). The vibration type zigzag pipeline attachment dust collector and the vibration type dust collector (20) are devices including a supply port (201) which supplies a crushed material pulverized by the crusher (10), a suction pipeline (202) which is disposed toward a top of the supply port (201), a disturbing member (203) that is a rotation blade or the like provided in the course of the suction pipeline (202) and kicks off a crushed material other than "fibrous dust", a zigzag pipeline (204) which is disposed toward a bottom of the supply port (201) and includes a plurality of bends in a pipeline, and a vibration generation damper which is vibration generation means (205) for vibrating the entire device.

In the vibration type zigzag pipeline attachment dust collector and the vibration type dust collector (20), light "fibrous dust" in the crushed material supplied from the supply port (201) is sucked to the suction pipeline (202) and is sucked to a dust collector. In contrast, the crushed material which is slightly heavier than "fibrous dust" moving upward along a gentle rising air stream falls downward by the disturbing member (203) and is settled on the lower portion of the zigzag pipeline (204) along with other heavy dust and heavy dust is conveyed to the next step by the conveyor (206).

The zigzag pipeline (204) is slightly vibrated up to down and right to left by the vibration generation damper (205). The vibration type zigzag pipeline attachment dust collector and the vibration type dust collector (20) eliminate a wire harness tangled in polyurethane as much as possible, send other heavy dust to the next step while dropping them downward in the zigzag pipeline (204), and have a volume reduction (quantitative reduction) effect of reducing the amount of ASR and SR. Further, the zigzag pipeline body (204) and the suction pipeline (202) at the upper portion thereof are coupled to each other by an elastic "bellows-shaped" connection tool (208) formed of rubber. This is to prevent the vibration of the zigzag pipeline (204) from being transmitted to the upper fixed part.

"Fibrous dust" including polyurethane, plastic, and the like collides with a wall inside the zigzag pipeline (204) while falling inside the zigzag pipeline (204) and the micro vibration of the zigzag pipeline (204) itself causes the coated copper wire (the wire harness) or the fine heavy material to deviate from polyurethane and the polyurethane becomes lighter. The light polyurethane is sucked from the suction pipeline (202) into the dust collector.

The cross-shaped windmill disturbing member (203) attached to a portion connected to the suction pipeline (202) located at the upper portion of the zigzag pipeline (204) has a function of preventing polyvinyl chloride and copper from going to the dust collector by tapping off the copper wire or hairy copper with a PVC coating stuck to the "fibrous dust" rising from below.

The air volume control valve (the damper) (207) (see FIG. 6) is attached to the suction pipeline (202) connected to the dust collector has a structure in which an air volume from the outside of a duct becomes the same as suction ability, which can be adjusted manually, so that polyurethane involved with the wire harness is not sucked to the dust collector.

Furthermore, falling ASR can be irradiated with an ultrasonic wave emitted from the bottom of the zigzag pipeline (204) (not shown). An ultrasonic wave can be emitted from a side surface or a lower portion of the zigzag pipeline (204) to the primary crushed ASR falling down through the zigzag pipeline so that the wire harness stuck to polyurethane easily peels off.

The suspended magnetic separator attachment vibration conveyor (30) is disposed next to the vibration type zigzag pipeline attachment dust collector (20). In the suspended magnetic separator attachment vibration conveyor (30), the crushed material is conveyed to the next magnet drum A (40) while being vibrated. A suspended magnetic separator is installed on the suspended magnetic separator attachment vibration conveyor (30) and an iron component is separated from the crushed material (the shredder dust) by the suspended magnetic separator.

In the magnet drum A (40), an iron component is further separated from the remaining crushed material by a magnetic force. Next, the crushed material is conveyed to the automatic non-ferrous separator (50).

<Configuration of Automatic Non-ferrous Separator>

Figure 9:
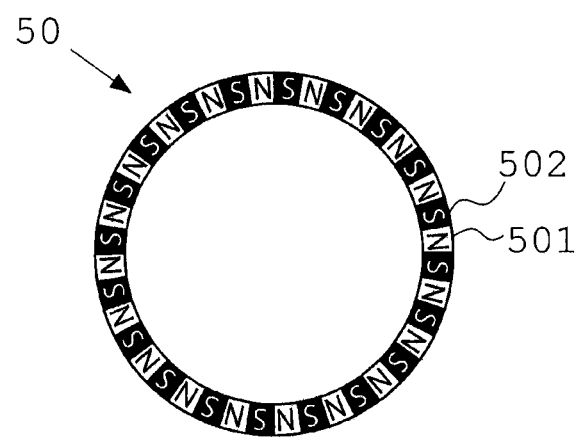
FIG. 9 is a schematic configuration view showing an arrangement of homopolar magnets of an automatic non-ferrous separator.

FIG. 9 is a schematic configuration view showing an automatic non-ferrous separator.

The automatic non-ferrous separator (50) is a 40-pole automatic non-ferrous separator which uses neodymium-based homopolar magnets as shown in the drawings. The performance of the automatic non-ferrous separator (50) is a separator in which N poles (501) and S poles (502) are sequentially arranged in the circumferential direction. As the number of homopolar magnets increases, the sorting ability of non-ferrous separators increases and fine nonferrous metals can be separated. The separable size is up to 5 mm in diameter with the conventional 24 poles and it is possible to separate up to around 1 mm of non-ferrous waste in 40 poles shown in the example.

Since the automatic non-ferrous separator (50) separates nonferrous metals as much as possible and separates stainless steel with the following treatment, there is an effect of reducing the chipping and wear of the shredding machine (80) and the turbo mill (100) to a considerable extent.

<Configuration of Metal Detector Attachment Sorting Device>

Figure 10:
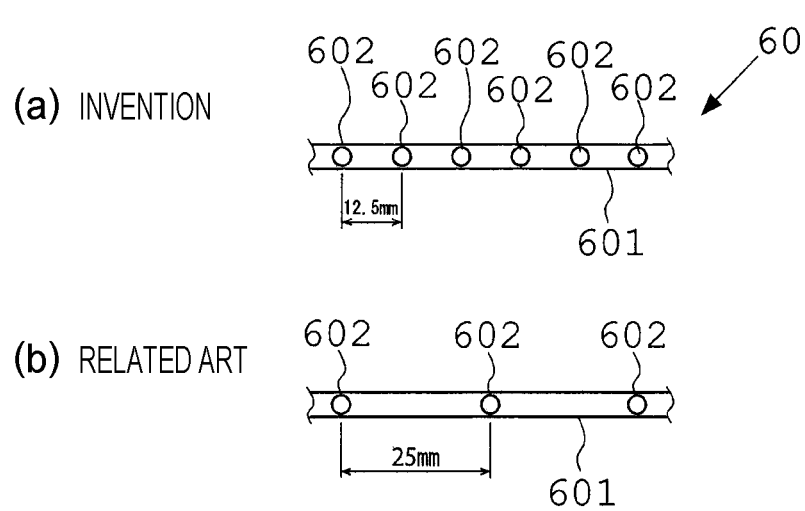
FIG. 10 is an enlarged schematic configuration view showing an air jet ejection device of a metal detector attachment sorting device, where (a) shows an air jet ejection device of the invention and (b) shows a conventional air jet ejection device for comparison.

FIG. 10 is an enlarged schematic configuration view showing an air jet ejection device of a metal detector attachment sorting device, where (a) shows an air jet ejection device of the invention and (b) shows a conventional air jet ejection device for comparison.

A metal detector attachment sorter (60) is a device having a combination of a metal detector and an air jet ejection device. In the air jet ejection device (60), the distance between the nozzles (602) in the pipeline (601) is decreased to 12.5 mm which is a half of the distance between the conventional nozzles. As shown in the drawings, the distance between the air jet nozzles (602) arranged horizontally in the conventional sorting device was 25 mm, but the air jet ejection device (60) of the invention has the distance of 12.5 mm. According to the metal detector attachment sorting device (60) of the invention, since it is possible to more finely eliminate metal, there is an effect of reducing a load of a high-speed crusher such as a shredding machine or a turbo mill or a blade wear rate after the elimination.

<Configuration of V-shaped Wind Power Sorting Device>

Figure 11:
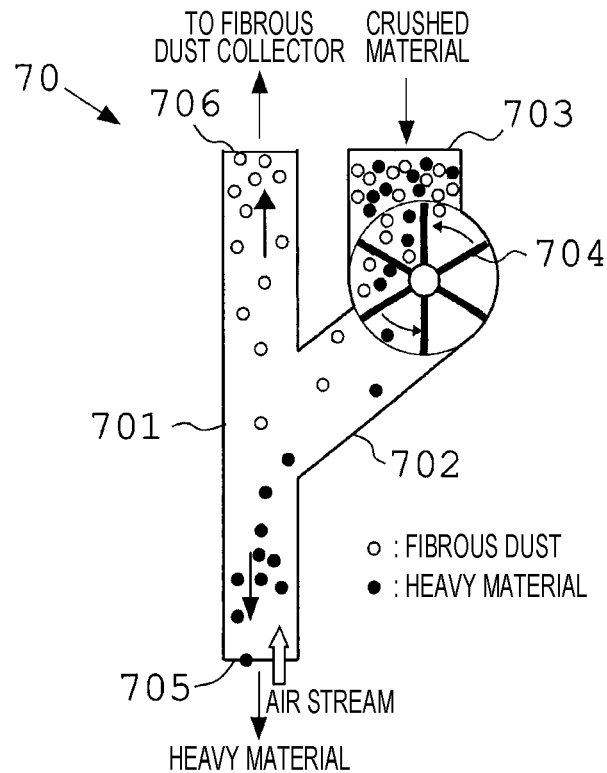
FIG. 11 is a schematic configuration cross-sectional view showing a V-shaped wind power sorting device.

FIG. 11 is a schematic configuration cross-sectional view showing a V-shaped wind power sorting device.

The V-shaped wind power sorting device (70) is disposed next to the metal detector attachment sorting device. The V-shaped wind power sorting device (70) includes a pipeline body (701) through which an air stream flows upward from below and a branch pipeline (702) which is provided in the course of the pipeline body (701). A crushed material is input from an inlet (703) which opens and closes the upper portion of the branch pipeline (702) by the rotation of the rotor valve. A large rotary valve (704) is attached between the inlet (703) and the branch pipeline (702) so as to keep the air tightness of the pipeline body (701). The rotary valve (704), that is, the rotation blade has a role of, when the crushed material is wound into the pipeline body (701), dropping the crushed material in such a manner that the pressure in the V-shaped wind power sorting device (70) does not drop. It is possible to separate light material such as polyurethane and plastic in the shredder dust by using wind power flying upward from the lower portion of the branch pipeline (702). Since it is possible to reduce the amount of bulky materials such as polyurethane or plastic flowing to the next step by 15 to 25% using the V-shaped wind power sorting device (70), there is an effect of largely reducing a load on the turbo mill or the air table after the next step.

A lower portion of the pipeline body (701) of the V-shaped wind power sorting device (70) is provided with a lower discharge port (705) which settles and discharges heavy crushed materials (particulate dust). An upper portion of the pipeline body (701) is provided with an upper discharge port (706) which discharges "fibrous dust".

Since the V-shaped wind power sorting device (70) sucks "fibrous dust" from the upper discharge port (706) of the pipeline body (701), light "fibrous dust" in the crushed material input from the inlet (703) can be sucked into the upper discharge port (706) from the branch pipeline (702) of the pipeline body (701). Meanwhile, the heavy crushed material settles down against an air stream and falls to the lower discharge port (705) of the pipeling body (701).

In the V-shaped wind power sorting device (70), since the rotary valve (704) keeps the air tightness inside the pipeline when a crushed material is input to the inlet (703), no turbulence is generated in the pipeline body (701). Then, "fibrous dust" is smoothly separated to the upper portion of the pipeline body (701) and the crushed material (particulate dust) is smoothly separated to the lower portion of the pipeline body (701). Accordingly, both of them can be moved to the next treatment device.

<Configuration of Shredding Machine>

The shredding machine (80) is disposed next to the V-shaped wind power sorting device (70). The shredding machine (80) is a machine which further crushes a material, obtained by eliminating metals from a material crushed into 25 mm or less by the crusher (10), into 8 mm or less.

The vibration type zigzag pipeline attachment dust collector (20) is disposed next to the V-shaped wind power sorting device (70) and the shredding machine (80). In the vibration type zigzag pipeline attachment dust collector (20), "fibrous dust" in debris is separated from a material or dust heavier than "fibrous dust".

<Configuration of Metering Feeder>

Figure 12:
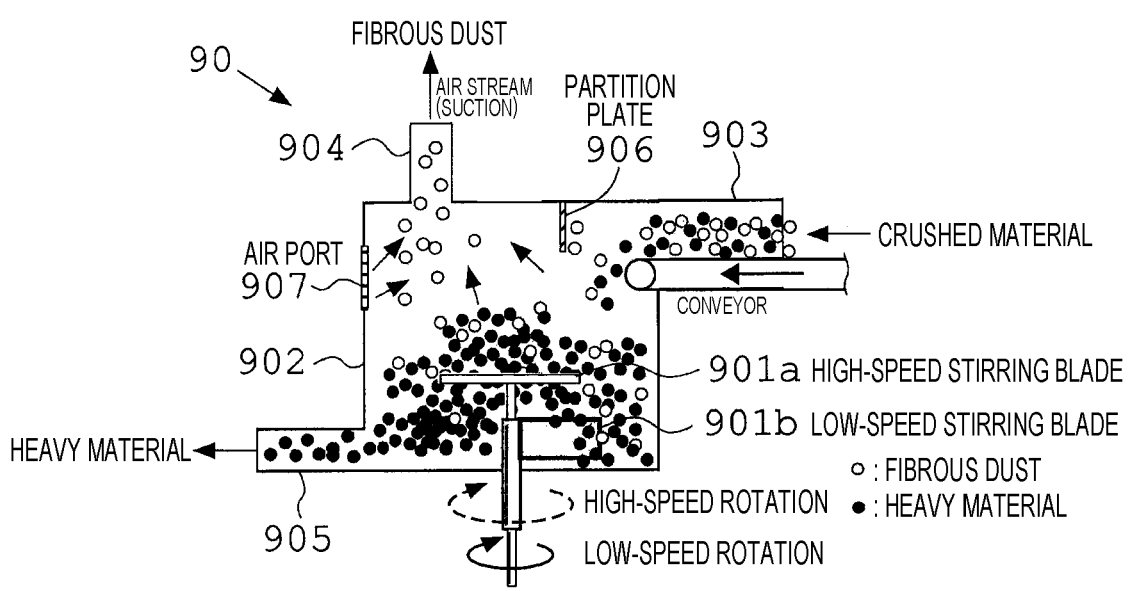
FIG. 12 is a schematic configuration cross-sectional view showing a "fibrous dust" collector attachment metering feeder.

FIG. 12 is a schematic configuration cross-sectional view showing a metering feeder.

The metering feeder (90) used for the stirring step (S9) is disposed next to the V-shaped wind power sorting device (70) and the shredding machine (80). The metering feeder (90) is a treatment device with a cylindrical body (902) including a high-speed stirring blade (901*a*) which rotates horizontally and a low-speed stirring blade (901*b*) which is provided below the high-speed stirring blade (901*a*) to rotate horizontally. The high-speed stirring blade (901*a*) is formed as, for example, a blade such as a chain and has a function of mainly mixing fibrous dust and dust heavier than the fibrous dust. The low-speed stirring blade (901*b*) has a function of mainly discharging heavy dust.

In the cylindrical body (902), a treatment device includes an inlet (903) which is provided in the periphery or the upper portion of the cylindrical body (902) so that a crushed material is input thereto, an upper discharge port (904) which is provided at an upper portion of the cylindrical body (902) to open upward and discharges light "fibrous dust" in debris, and a lower discharge port (905) which is provided in the periphery or the lower portion of the cylindrical body (902) and discharges debris heavier than the separated "fibrous dust". Further, a partition plate (906) is provided between the inlet (903) and the upper discharge port (904) so that dust heavier than "fibrous dust" is not sucked from the upper discharge port (904).

In the metering feeder (90), when debris is input to the inlet (903), debris is mixed by the upper high-speed stirring blade (901*a*). When light "fibrous dust" floats and is sucked from the upper discharge port (904), "fibrous dust" is sucked and discharged to the upper discharge port (904) along with air sucked from the air port (907) corresponding to a small hole opening in the periphery of the cylindrical body (902). Meanwhile, the heavy crushed material (particulate dust) does not float and is discharged to the lower discharge port (905) by the rotation of the lower low-speed stirring blade (901*b*), so that the crushed material can be moved to the next treatment device.

This metering feeder (90) is a treatment device which reduces the amount of "fibrous dust" going to the post line similarly to the zigzag pipeline attachment dust collector (20).

<Configuration of Turbo Mill>

Figure 13:
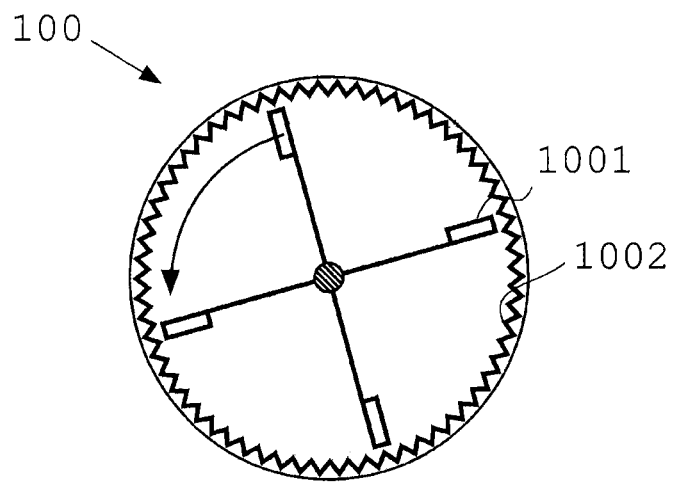
FIG. 13 is a schematic configuration cross-sectional view showing a turbo mill.

FIG. 13 is a schematic configuration cross-sectional view showing an interior of a turbo mill.

The turbo mill (100) which is used in the pulverizing step (S10) is disposed next to the metering feeder (90). Here, when the conventional shredding machine is changed to the turbo mill, the treatment ability per hour/unit can be largely increased to 3 tons/hour corresponding to two times 1.5 tons/hour achieved so far. When two turbo mills are provided, since the treatment ability per hour is 6 tons, the treatment amount becomes 42 tons/day in the case of operation of 7 hours per day. Then, it is possible to treat 1,000 tons in one month (25 days). Although the motor horsepower is the same such that the conventional crusher is 160 kW/unit and the turbo mill (100) of the invention is 132 kW (83%), but there is a double difference in throughput. Accordingly, the amount of electricity applied to 1 kg of the crushing/shredding treatment drops to 1/2.5. This turbo mill (100) has a $CO_2$ reduction effect.

The shredding machine has been doubled in the treatment ability by changing a conventional machine used to reduce the size to 6 mm or less to a high-speed turbo mill. Although the rotation blade is slightly smaller than that of the related art, a rectangular parallelepiped shape having the same cutting edge as that of the related art such that the cutting edge has an angle of 90° is used so that the cutting edge does not fly or early wear does not occur due to metal scraps. The shredder dust pulverizing operation is performed by the friction between a rotation blade (1001) and an unevenness (1002) of an inner wall of a main body of the turbo mill (100). The particle size of the pulverizing is determined by adjusting a gap (clearance) between the rotation blade and the unevenness of the inner wall of the turbo mill. A difference in production capacity between the conventional crusher (330 rpm/min) and the corresponding turbo mill (1,500 rpm/min) is a difference between an ordinary car and an F1 race car equipped with a turbo engine. The inventor of the invention first suggested to use the turbo mill (pulverizer) of this type in the shredder dust pulverizing operation.

<Configuration of Cyclone>

Figure 14:
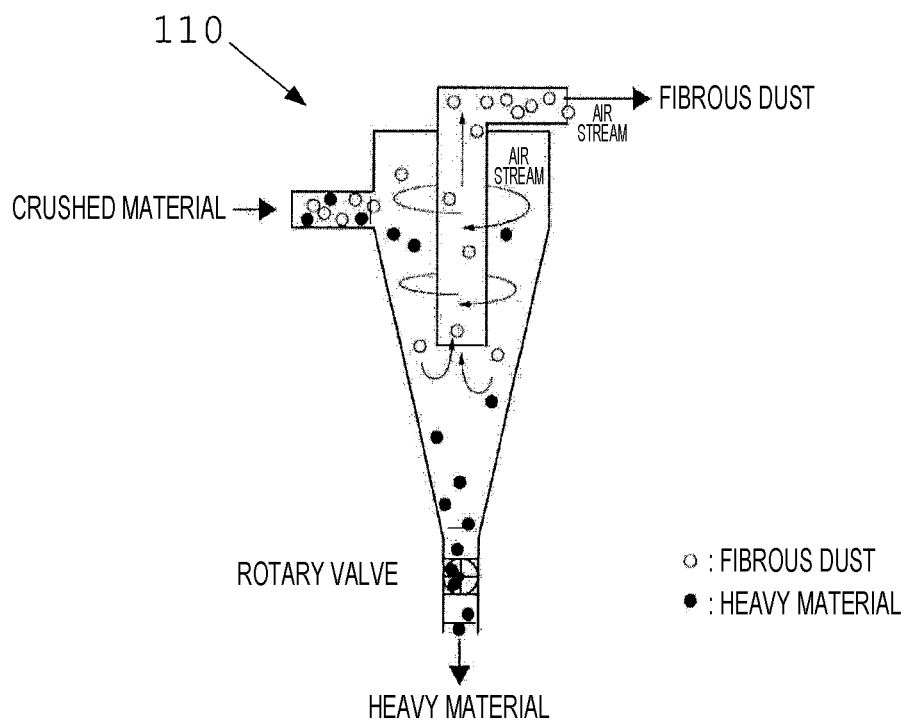
FIG. 14 is a schematic configuration cross-sectional view showing a cyclone.

FIG. 14 is a schematic configuration cross-sectional view showing a cyclone.

The cyclone (110) is disposed next to the turbo mill (100) in order to further collect "fibrous dust". The cyclone (110) having a configuration shown in the drawings is used. Accordingly, the heavy crushed material settles down and the floating "fibrous dust" is collected to the upper portion and is sent to the main dust collector (160). The cyclone (110) is used to eliminate "fibrous dust" in the treatment device of the invention as much as possible in order to reduce a load of the air table (120) similarly to other dust collectors. The rotary valve attached to the lower portion of the cyclone is a device used to prevent a problem in which external air enters the cyclone and suction ability decreases when metal scraps such as copper, aluminum, and iron heavier than "fibrous dust" or other "particulate dust" are discharged from the lower portion of the cyclone.

<Configuration of Large Air Table>

Figure 15:
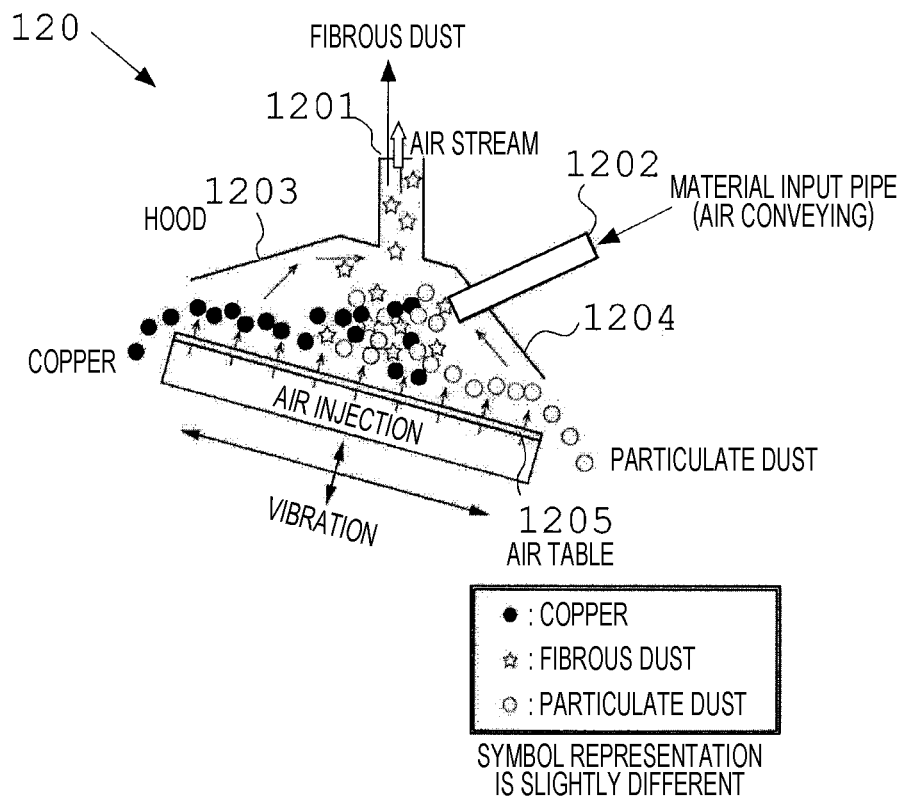
FIG. 15 is a schematic configuration cross-sectional view showing an air table separating aluminum.

FIG. 15 is a schematic configuration cross-sectional view showing an air table.

The large air table (120) which is used in the fibrous dust/particulate dust separation step (S11) to separate copper, aluminum, or iron is disposed next to the cyclone (110). In the large air table (120), "fibrous dust" which cannot be separated by the treatment devices is separated and collected and "particulate dust" is also separated and collected at the same time. A trapezoidal hood (1203) having a suction port (1201) provided at an upper portion and a pulverized material inlet (1202) provided in the vicinity of the suction port and an air table (1205) having a plurality of injection ports (1204) opening below the hood (1203) are disposed in an inclined state and the air table (1205) is vibrated while air is injected upward from the injection ports (1204) of the air table (1205). When a pulverized material is dropped onto the surface of the air table (1205), heavy copper can be moved to the oblique upper side of the inclined air table (1205) and "particulate dust" lighter than copper can be moved to the oblique lower side of the inclined air table (1205). Floating "fibrous dust" is sucked from the suction port (1201) and is collected by the main dust collector (160).

<Configuration of Hairy Copper Separation Circular Vibration Sieve>

Figure 16:
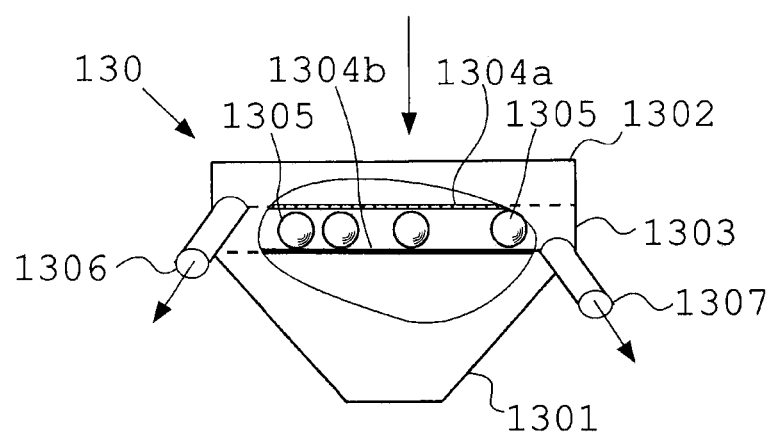
FIG. 16 is a schematic configuration view showing a hairy copper separation circular vibration sieve in a partially notched state.

FIG. 16 is a schematic configuration view showing a hairy copper separation circular vibration sieve in a partially notched state.

The hairy copper separation circular vibration sieve (130) used in the hairy copper separation and collection step (S12, S31) is disposed next to the large air table (120). The hairy copper separation circular vibration sieve (130) is a device for separating hairy copper from other "particulate dust" since a thin copper wire (hairy copper) still remains much in "particulate dust".

In the hairy copper separation circular vibration sieve (130), a metal plate (1304*b*) is placed under one fine-grained wire mesh (1304*a*) in the course of the cylindrical portion (1303) continuously formed downward from an upper inlet (1302) of a funnel-shaped sieve body (1301). A plurality of stainless steel spherical oscillators (1305) are sandwiched between the wire mesh (1304*a*) and the metal plate (1304*b*) in a freely bouncing state. The diameter of the mesh hole of the wire mesh (1304*a*) is changed to be separated into thick copper and hairy copper or "particulate dust" and hairy copper and the copper is discharged from a side discharge port (1306) and a side discharge port (1307) of the sieve body (1302). Furthermore, it is also possible to divide the thickness of the hairy copper by changing the size of the mesh of the wire mesh and attaching the wire mesh to plural sheets or multiple layers. The vibration generator is provided inside the sieve body (1301).

Since the oscillator (1305) vigorously bounces between the wire mesh (1304*a*) and the metal plate (1304*b*) in accordance with the vibration of the sieve body (1301), the clogging of the mesh hole of the wire mesh (1304*a*) does not occur.

<Configuration of Neodymium Magnet Drum>

Figure 17:
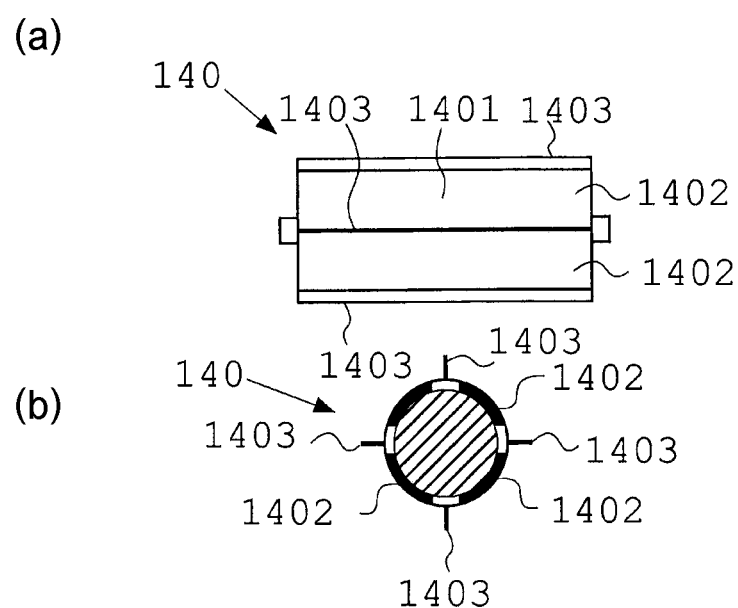
FIG. 17 is a schematic configuration view showing a neodymium magnet drum, where (a) is a front view and (b) is a cross-sectional view.

FIG. 17 is a schematic configuration view showing a neodymium magnet drum, where FIG. 17(*a*) is a front view and FIG. 17(*b*) is a cross-sectional view.

A neodymium magnet drum (140) is disposed next to the hairy copper separation circular vibration sieve (130). A piece of iron mixed in a thick copper wire cannot be completely eliminated with a normal magnetic magnet drum because the iron piece has a thin and elongated shape but is slightly larger than the diameter of copper (approximately half the size of rice grain). Therefore, the neodymium magnet drum (140) has a configuration in which a neodymium magnet (1402) is attached at four positions of a cylindrical roll body (1401) in the longitudinal direction and protrusions (1403) are formed at four positions in the longitudinal direction of the roll body (1401) between the neodymium magnets (1402). The iron piece is easily wound under the magnet drum (140) while iron pieces mixed with thick copper are stuck to the drum. Since the iron piece is wound below the magnet drum (140), copper can be dropped to the front side of the magnet drum (140) and the iron piece can be dropped to a belt conveyor (not shown) below the magnet drum (140).

<Configuration of Treatment device of "Fibrous Dust" Treatment Line>

Figure 18:
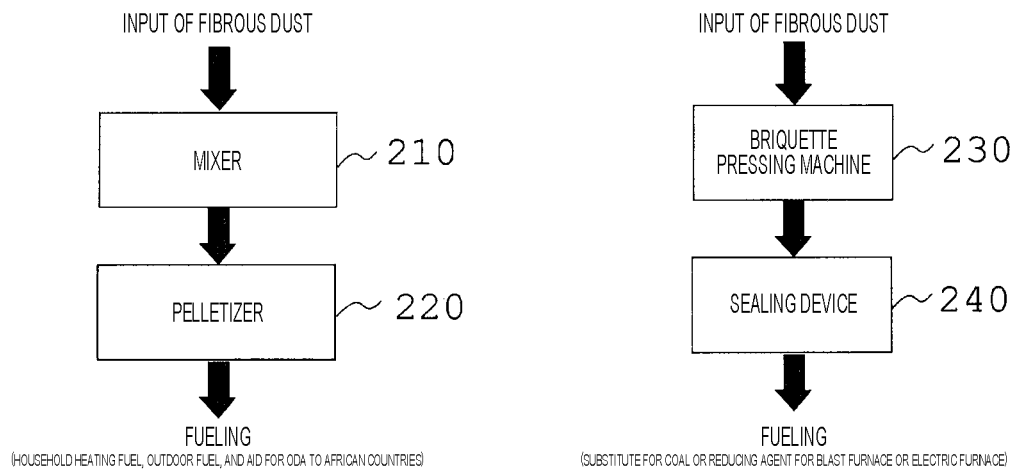
FIG. 18 is a block diagram showing a basic embodiment of a treatment device of a "fibrous dust" treatment line, where (a) shows a household service fueling treatment line, (b) shows an industrial fueling treatment line, and (c) shows a coke production treatment line.
Figure 18:
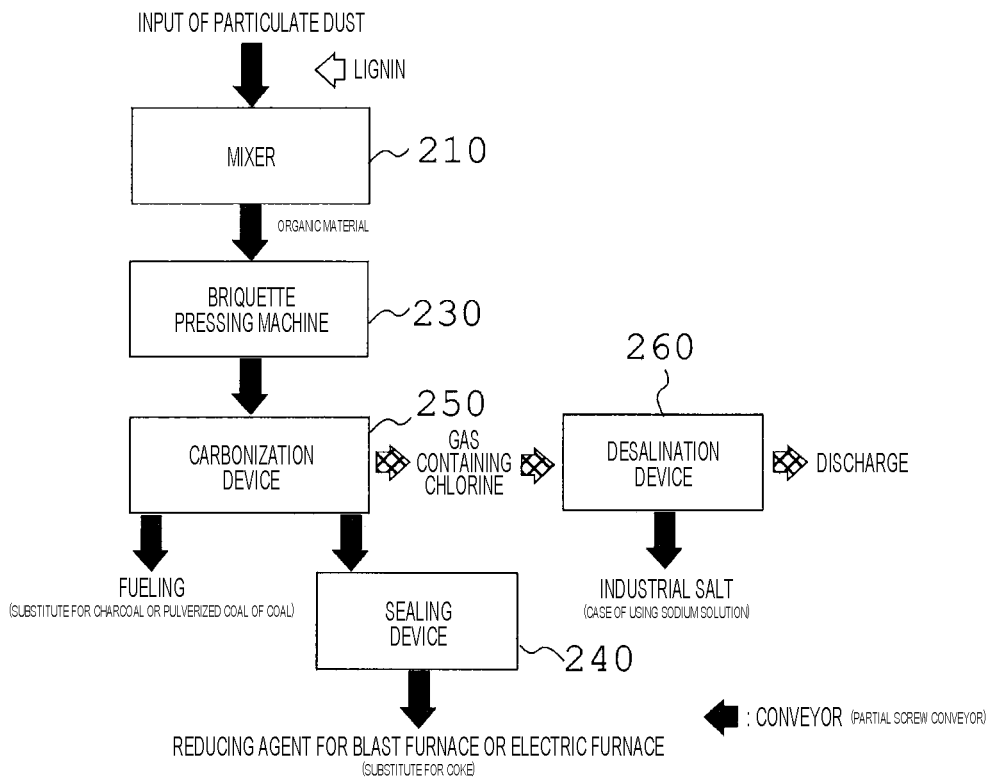
Figure 19:
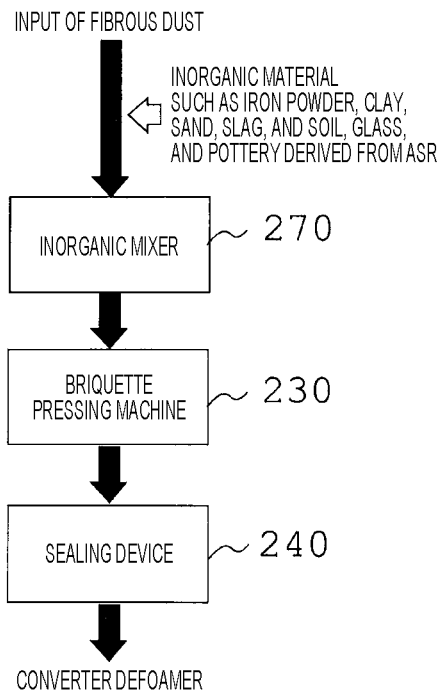
FIG. 19 is a block diagram showing a basic embodiment of the treatment device of the "fibrous dust" treatment line, where (d) shows a defoamer production treatment line, (e) shows a defoamer production treatment line, and (f) shows a recycled part material production treatment line.
Figure 19:
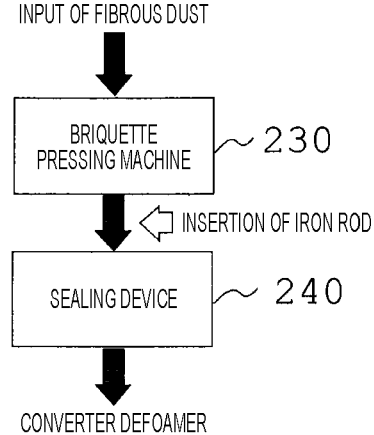
Figure 19:
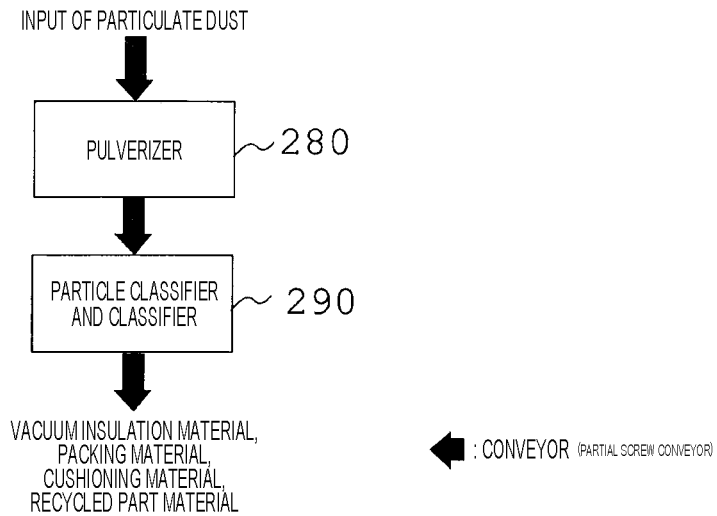
Figure 20:
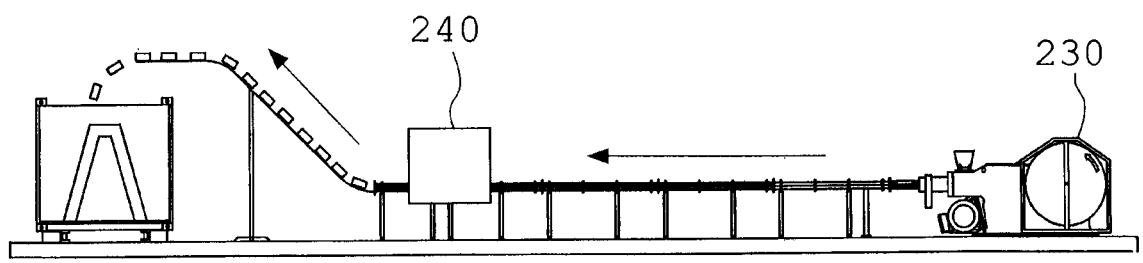
FIG. 20 is a front view showing one arrangement example of each treatment device of the fueling treatment line.

FIG. 18 is a block diagram showing a basic embodiment of a treatment device of a "fibrous dust" treatment line, where (a) shows a household service fueling treatment line, (b) shows an industrial fueling treatment line, and (c) shows a coke production treatment line. FIG. 19 is a block diagram showing a basic embodiment of a treatment device of a "fibrous dust" treatment line, where (d) shows a defoamer production treatment line, (e) shows a defoamer production treatment line, and (f) shows a recycled part material production treatment line. FIG. 20 is a schematic configuration view showing a briquette pressing machine used in an industrial fueling treatment line.

As shown in FIG. 18(*a*), a treatment device which is used in a household service fueling treatment line includes a mixer (210) which mixes "fibrous dust" with demineralizer and a pelletizer (220) which performs a small solidifying operation.

For household use, slaked lime or hypo is mixed with "fibrous dust" for the purpose of neutralizing chlorine and the mixed one is solidified into a size of a thumb so that the mixed one is used as fuel for household heaters and outdoor. By mixing a strong adhesive binder (binding agent) with "fibrous dust", it is also possible to use a charcoal production machine as a solidification device in addition to the pelletizer (220).

As shown in FIG. 18(*b*), the industrial fueling treatment line includes a briquette pressing machine (230) and a sealing device (240). The briquette pressing machine (230) for solidification naturally becomes large for industrial applications where the amount required is incomparably higher than that for household use. A solidified material is sealed so that the material does not change and the handling is easy. The industrial briquette pressing machine (230) and the sealing device (240) are disposed in the same order as shown in FIG. 20. The briquette pressing machine (230) is a treatment device which solidifies "fibrous dust", separated and collected by the above-described treatment device, into a predetermined size by striking a material while converting the force of the rotating flywheel into a compressive force. The sealing device (240) is a treatment device which seals "fibrous dust" solidified by the briquette pressing machine (230) in an artificial casing, an iron pipeline, an empty can, or the like. When the artificial casing is used in the sealing device (240), it is possible to add a function of performing a vacuum sealing operation after tightly packing "fibrous dust" in the artificial casing by using a material compressing force of the briquette pressing machine (230). Sealed briquettes of "fibrous dust" produced by this operation can be used as a substitute for coal or as a reducing agent for blast furnaces and electric furnaces.

<Configuration of Briquette Press Machine>

Figure 21:
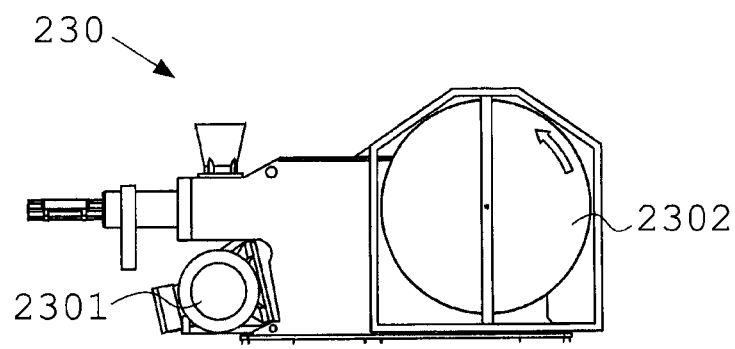
FIG. 21 is a schematic configuration view showing a briquette pressing machine.

FIG. 21 is a schematic configuration view showing a briquette pressing machine used in an industrial fueling treatment line.

The briquette pressing machine (230) used to solidify "fibrous dust" is referred to as a mechanical briquette pressing machine as shown in FIG. 21 and is a treatment device which performs a compressing and solidifying operation by rapidly striking a material by a hammer using a force of a flywheel (2302) rotated by an electric motor (2301) instead of a hydraulic motor. The reason why the mechanical briquette pressing machine (230) is used is because the electric energy consumption amount of the electric motor (2301) is as inexpensive as about ⅓ of that of a hydraulic screw compression briquette pressing machine. The $CO_2$ emissions will also be lower than that of the hydraulic screw compression briquette pressing machine to the same degree. Further, in the case of the hydraulic screw compression briquette pressing machine, there is also a disadvantage that replacement and maintenance of wear parts such as screws and hydraulic parts are expensive.

The briquette pressing machine (230) is a machine usually used for the purpose of solidifying organic materials such as waste wood and paper sludge or hard waste plastic for fuel. In the invention, this machine is used to solidify fibrous dust such as polyurethane and plastic that have a high springback force (return force) even in a crushed/shredded/pulverized state. For that reason, the disadvantage of low bulk density of the final briquette product is inevitable. In order to supplement that defect, "fibrous dust" solidified by the briquette pressing machine (230) is inserted into a cylindrical artificial casing (usually used for casing of salami or ham) so as not to be deformed by using the following sealing device (240), air is evacuated, and both ends are closed by aluminum wires to become a packed state (or a vacuum packed state).

<Configuration of Sealing Device>

As shown in FIG. 20, the sealing device (240) is also used to prevent the deformation of "fibrous dust" compressed by the briquette pressing machine (230). In the sealing device (240), the solidified dust is inserted into an artificial casing of a predetermined diameter (for example, about 70 to 85 mm in diameter) in the course of the conveying pipeline using the material conveying power of the briquette pressing machine and aluminum clasps are tightened on both sides of the casing. Since "fibrous dust" is further compressed and solidified by the vacuum pack of the sealing device (240) and the automatic clasp clipping device (commonly called a clipper), the dust does not chip or scatter even if the dust is dropped from the height of 5 m which is a strength standard required by steel makers.

At the same time, since the inside of the casing is anoxic due to the vacuum pack, there is an advantage that the risk of spontaneous ignition in the inventory is extremely low. It is also possible to use iron products such as thin pipes and empty cans as artificial casings instead of artificial casings. Although the degree of vacuum decreases, it has the effect of increasing the bulk density and strengthening the strength of the compressed product.

<Configuration of Treatment Device of (c) Coke Production Treatment Line of "Fibrous Dust">

A treatment device of a coke production treatment line is a coke production line which includes a mixer (210) which mixes "fibrous dust" with lignin, a briquette pressing machine (230), a carbonization device (250), a desalination device (260), and a sealing device (240) as shown in FIG. 18(c).

<Configuration of Treatment device of (d) Converter Defoamer Treatment Line of "Fibrous Dust">

As shown in FIG. 19(d), the defoamer production treatment line is a treatment device including an inorganic mixer (270) which mixes inorganic materials such as iron powder, clay, sand, slag, and soil, glass, and pottery derived from ASR with shredder dust such as ASR while adjusting the bulk density to 1.8 to 2.0, a briquette pressing machine (230), and a sealing device (240). These are arranged in this order. This inorganic mixer (270) is a treatment device which mixes inorganic materials such as iron powder, clay, sand, slag, and soil, glass, and pottery derived from ASR to increase the bulk density. The briquette pressing machine (230) is a treatment device which highly compresses "fibrous dust" separated and collected by the above-described treatment device into a predetermined size. The sealing device (240) is a treatment step of sealing "fibrous dust" in a briquette state solidified by the briquette pressing machine (230). Briquettes of "fibrous dust" generated in this way can be used as a converter defoamer since the bulk density due to the above-described additives is 2 or more.

<Configuration of Treatment device of (e) Converter Defoamer Treatment Line of "Fibrous Dust">

As shown in FIG. 19(e), the treatment device of the second defoamer production treatment line is a treatment device including a briquette pressing machine (230) and a sealing device (240). In this treatment line, an iron rod is inserted into a center of a solidified product in the longitudinal direction in order to increase the bulk density of "fibrous dust" solidified in a cylindrical shape of a predetermined size by the briquette pressing machine (230) from 1.8 to 2. Briquettes of "fibrous dust" generated in this way can be used as a converter defoamer. Furthermore, a hole through which the iron rod is inserted can be automatically formed by the briquette pressing machine (230) used in the invention.

Here, the reason why a material obtained by cutting a commercial iron rod is inserted into "fibrous dust" in a briquette state (solidified state) is because the bulk density needs to be increased as described above. Furthermore, the iron rod used here is different from iron powder generated from shot brass and iron powder of which properties and components are not constant and discharged from an electric furnace and a blast furnace. For example, a standard mild steel manufactured according to the JIS standard of 10 to 20 mm in diameter and 50 to 200 mm in length is used. Thus, when the iron rod manufactured based on the JIS standard is used as a material to increase the specific gravity of the defoamer, the final component of the "fibrous dust" becomes clearer. Accordingly, there is an advantage that the quality of the final briquette product produced also can be calculated by steel makers to some extent.

Further, in the case of iron rods, briquette products produced in this way can be secured at a required amount when desired and stable price that cannot be expected from industrial waste. Control of the specific gravity of the final product is also easy and accurate. In the case of the defoamer of the invention, the inside of the casing is in a state close to a vacuum state since air is evacuated from the casing.

Even if it is stored, there is no risk of fire caused by an exothermic reaction. Furthermore, the thickness and length of the iron rod inserted in the solidified "fibrous dust" can be changed if necessary.

The first element required for the converter defoamer is high calorie. The number of calories of "fibrous dust" is about 7,000 kcal/kg as described above. The next element required for the defoamer is a bulk density of 1.8 or more. In the case of "fibrous dust", the combustible chlorine content that causes dioxins is also 0.5% or less (0.34 to 0.71%) and the copper content is already low at 0.5% or less. However, the combustible chlorine content can be further reduced (0.3% or less: equivalent to RPF A product) while passing through the desalination device (260) or sodium water after rapid cooling of the exhaust gas.

Since industrial waste that has been incinerated and landfilled without being effectively used at present is obtained by passing polyurethane waste along with the input material of the invention through the crushing, sorting, and dust collecting treatment steps of the invention, the combustible chlorine content can be reduced to 0.3% or less without causing deterioration in final quality of "fibrous dust".

<Configuration of Treatment device of (f) Recycled Part Material Production Treatment Line of "Fibrous Dust">

As shown in FIG. 19(f), the recycled part material production treatment line is a treatment facility mainly including a pulverizer (280) and a particle classifier/classifier (290). These are arranged in this order. This pulverizer (280) is a treatment device which pulverizes "fibrous dust". The particle classifier and classifier (290) is a treatment device which performs a particle classifying/classifying operation on "fibrous dust" pulverized by the pulverizer (280). The "fibrous dust" generated in this way can be used as a vacuum heat insulating material, a packing material, a cushioning material, and a recycled part material.

<Configuration of "Particulate Dust" Treatment Device>

Figure 22:
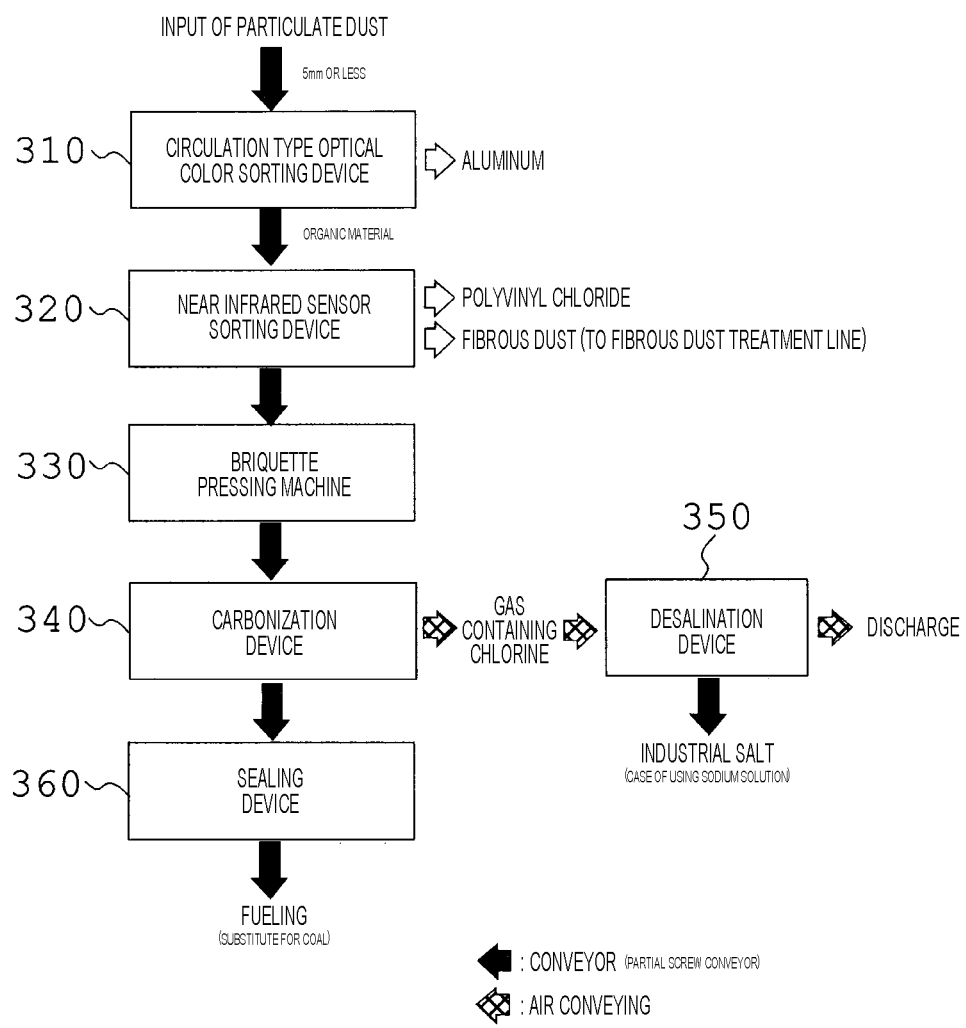
FIG. 22 is a block diagram showing (a) a coal production treatment line of a basic embodiment of a treatment device of a "particulate dust" treatment line.
Figure 23:
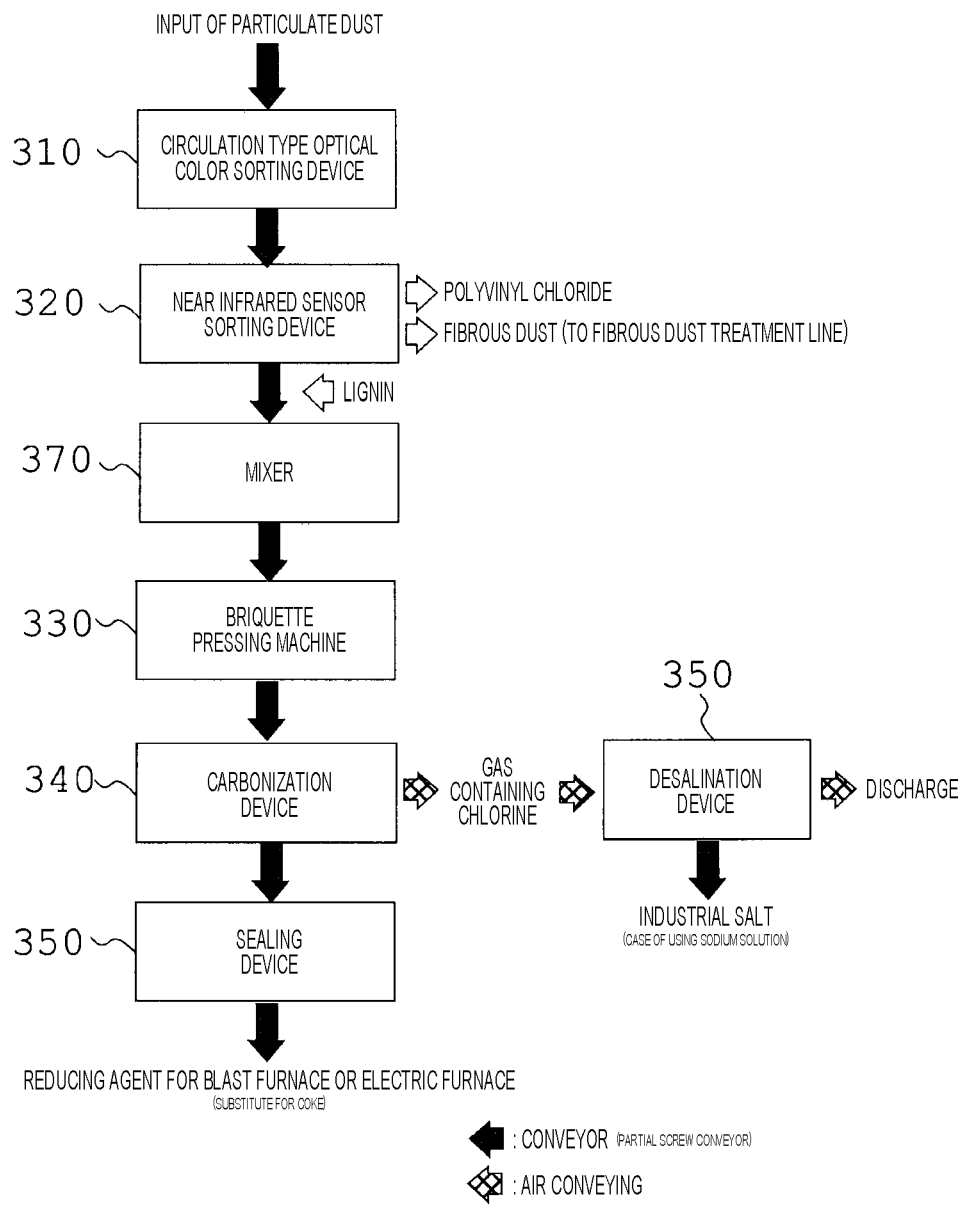
FIG. 23 is a block diagram showing (b) a coke production treatment line of a basic embodiment of the treatment device of the "particulate dust" treatment line.
Figure 24:
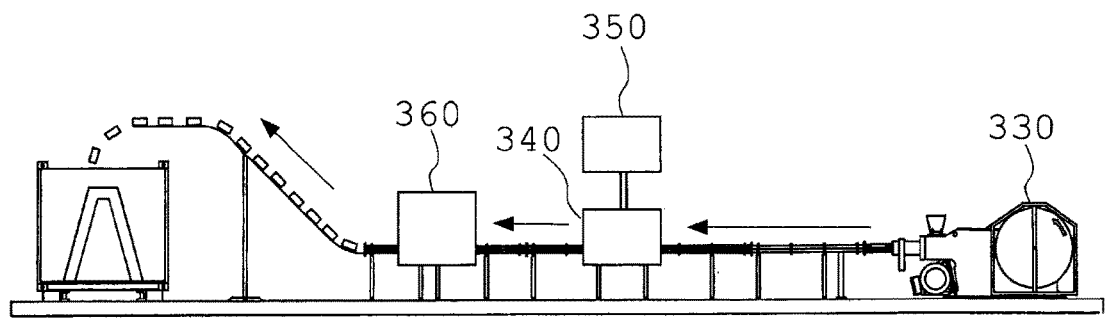
FIG. 24 is a side view showing one arrangement example of each treatment device.

FIG. 22 is a block diagram showing (a) a coal production treatment line of a basic embodiment of the treatment device of the "particulate dust" treatment line. FIG. 23 is a block diagram showing (b) a coke production treatment line of a basic embodiment of the treatment device of the "particulate dust" treatment line. FIG. 24 is a side view showing one arrangement example of each treatment device.

<Configuration of Treatment device of (a) Coal Production Treatment Line of "Particulate Dust">

As shown in FIG. 22(a), the treatment device of (a) the coal production treatment line is a treatment device mainly including a circulation type optical color sorting device (310), a near infrared sensor sorting device (320), a briquette pressing machine (330), a carbonization device (340), a desalination device (350), and a sealing device (360). As shown in FIG. 24, these are arranged in this order. The circulation type optical color sorting device (310) is a treatment device which sorts aluminum from "particulate dust". The briquette pressing machine (330) is a treatment device which compresses "particulate dust" separated and collected by the above-described treatment device into a predetermined size. The carbonization device (340) is a treatment device which carbonizes "particulate dust" so that the dust is easily used as fuel.

However, since "particulate dust" passing through the near infrared sensor sorting device (320) of an air jet type using a near infrared sensor so that polyvinyl chloride is removed contains no chlorine or contains only a small amount of chlorine after aluminum scrap is eliminated by the circulation type optical color sorting device (310), the particulate dust can be conveyed to the "fibrous dust" accumulation site and be processed into various fuels while being mixed with fibrous dust.

The dust can be used as a substitute for coal by the sealing device (360). Further, the dust can be used as a reducing agent for a blast furnace or an electric furnace. The sealing device (360) can be set as a vacuum sealing device which performs a vacuum sealing operation. A treatment operation ends now.

Further, "particulate dust" which is treated by the carbonization device (340) can be used as an industrial salt in the case of using a sodium solution by removing polyvinyl chloride contained therein using the desalination device (350).

<Configuration of Material Circulation Circuit Attachment Optical Color Sorting Device>

Figure 25:
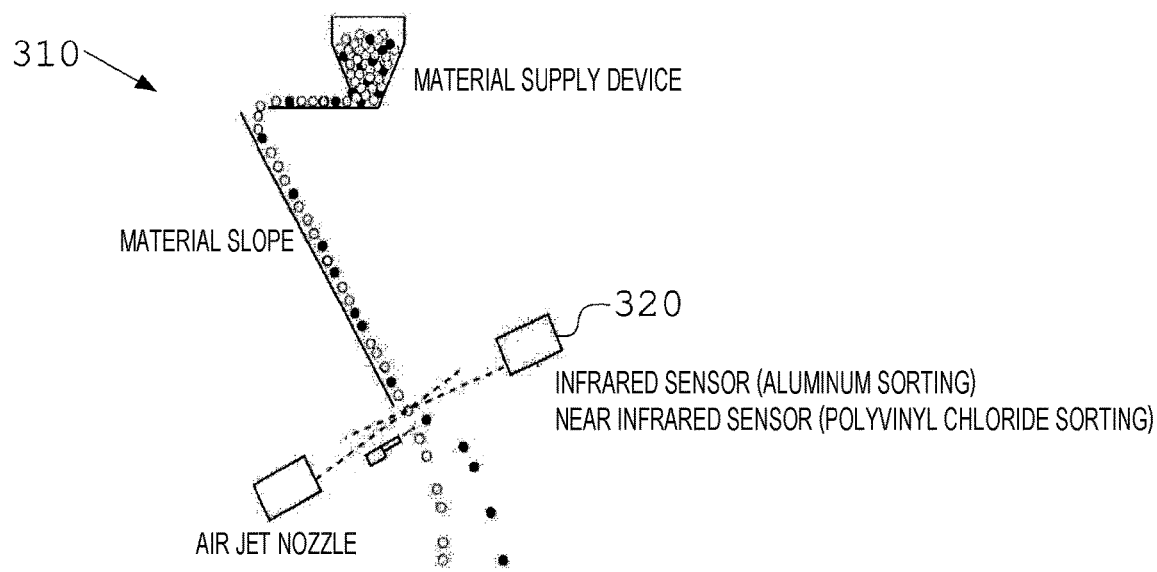
FIG. 25 is a side view schematically showing a material circulation circuit attachment optical color sorting device.
Figure 26:
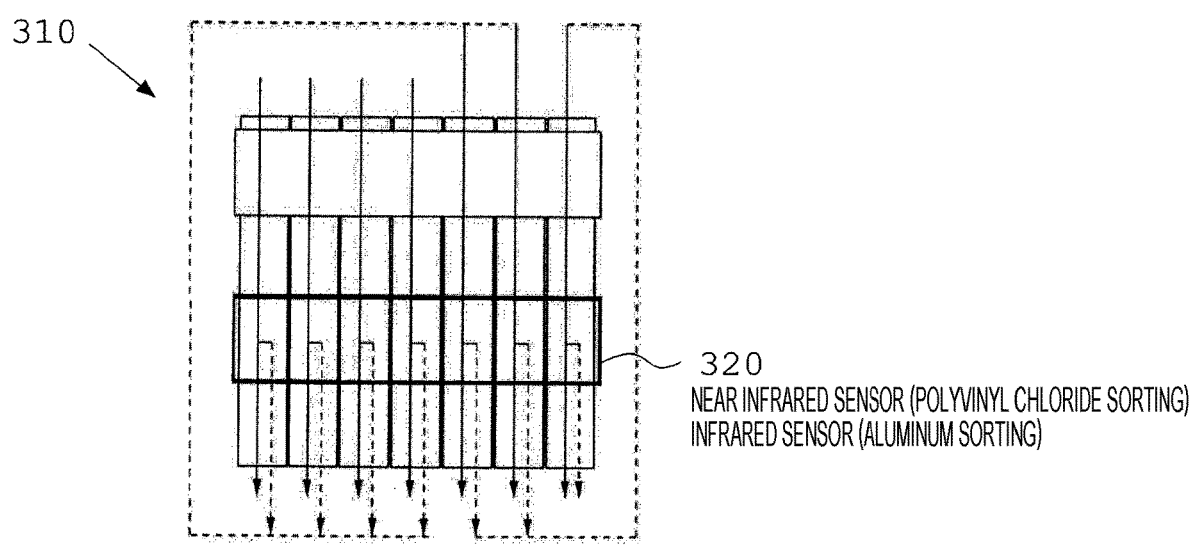
FIG. 26 is a front view schematically showing the material circulation circuit attachment optical color sorting device.
Figure 27:
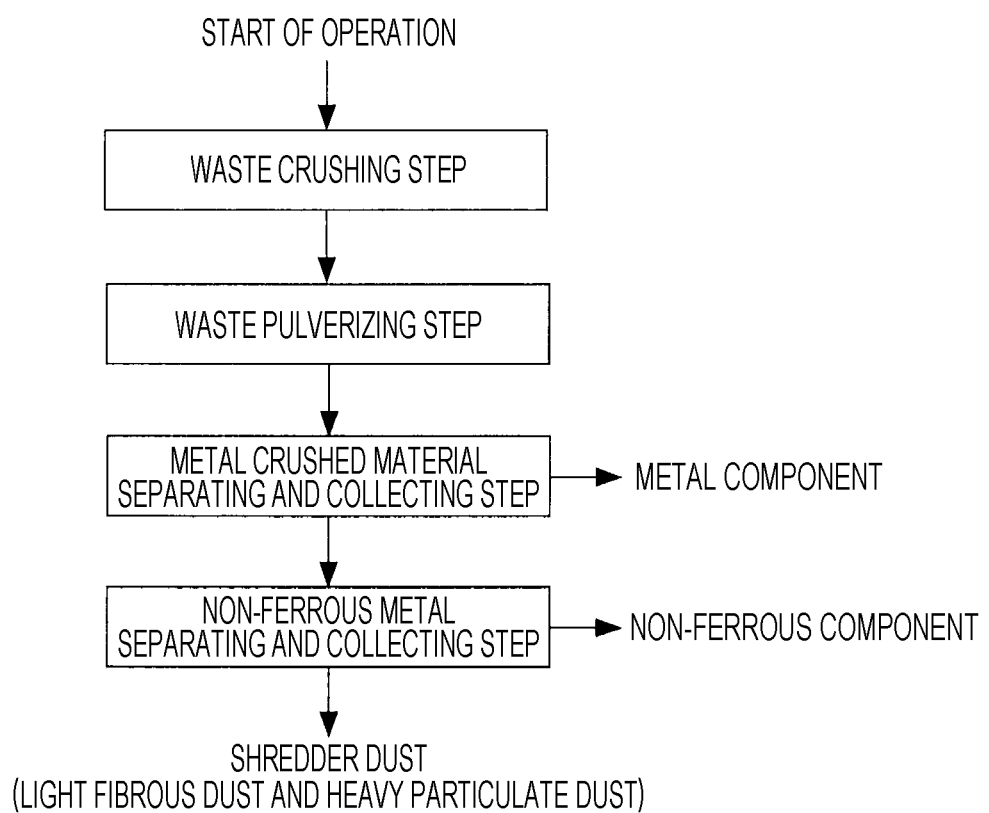
FIG. 27 is a working flowchart showing a conventional general shredder dust treatment method.
Figure 28:
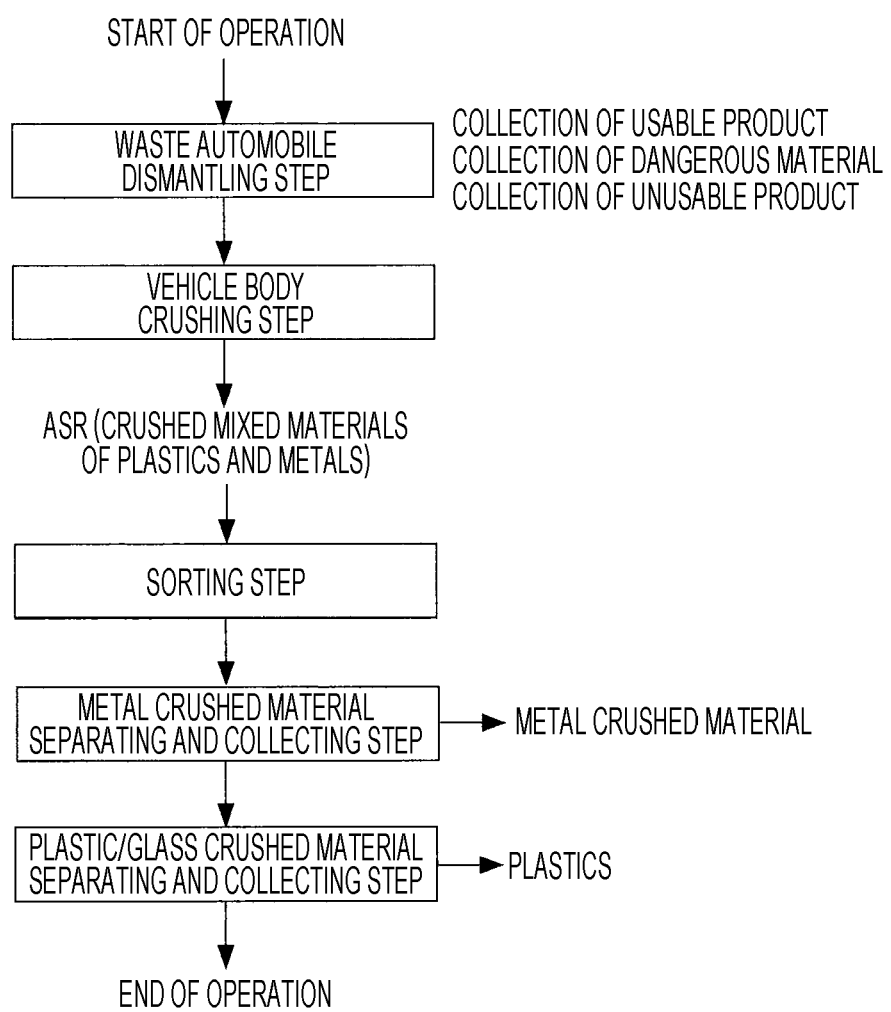
FIG. 28 is a working flowchart showing a conventional automobile shredder dust treatment method.

FIG. 25 is a side view schematically showing a material circulation circuit attachment optical color sorting device. FIG. 26 is a plan view schematically showing the material circulation circuit attachment optical color sorting device.

As shown in the drawings, the material circulation circuit attachment optical color sorting device (the circulation type optical color sorting device) (310) is a treatment device which collects aluminum scrap. In the air table (120), "particulate dust" such as rubber, wood chips, hard plastic, copper wire coating (polyvinyl chloride), and aluminum which is heavier than polyurethane and cannot be sucked by a dust collector is discharged. In order to collect aluminum scrap contained therein, the optical color sorting device (310) that blows away a material of a specific color by jet air is used. Since this device has a function of circulating the same lot of "particulate dust" three times, the leakage is very small even with a fine particle size under 5 mm.

<Configuration of Near Infrared Sensor Sorting Device>

FIGS. 25 and 26 are side and front views showing the near infrared sensor sorting device (320) which separates polyvinyl chloride using a near infrared sensor as well as the material circulation circuit attachment optical color sorting device (the circulation type optical color sorting device) (310). A difference between the two devices is only whether they use an optical sensor or a near infrared sensor. In this device, polyvinyl chloride is separated from "particulate dust" by being blown away by high-pressure air injected from an air jet nozzle as in the case of the aluminum scraps as shown in FIG. 25.

<Configuration of Carbonization Device>

A high frequency generator or the carbonization device (340) using a city gas is used in order to extract and carbonize combustible chlorine caused by PVC contained in "particulate dust" in shredder dust (about 20% of the total weight of waste automobiles in the case of ASR). Constituent materials of "particulate dust" are wood chips, rubber, hard plastic, cloth scraps, polyvinyl chloride, other wire covering materials, and sheet materials. This dust contains about 10 to 12% of polyvinyl chloride which generates combustible chlorine at a high temperature. Naturally, this cannot be used as it is as a fuel for incineration or as a binder for defoamer. Therefore, the carbonization device (340) is used in a solidification line.

The carbonization device (340) uses a high frequency generator or a city gas as a heat source for carbonization. By using the carbonization device (340), a material solidified by the briquette pressing machine (330) is carbonized while being steamed and baked in the course of the conveying pipeline. When the carbonized "particulate dust" is inserted into a semi-transparent casing in a vacuum packed state, the particulate dust can be used as alternative fuel of pulverized coal or coal to be burned in a thermal power plant or a municipal incinerator or a reducing agent for a blast furnace or an electric furnace.

Furthermore, it is needless to say that the carbonization device (340) is used to process "fibrous dust" into charcoal or pulverized coal.

<Desalination Device of Combustible Chlorine Gas>

The desalination device (350) is a treatment device which eliminates combustible chlorine caused by polyvinyl chloride contained in "particulate dust". Combustible chlorine is generated due to polyvinyl chloride contained in "particulate dust" in the course of the conveying pipeline which is heated by heat from a high frequency or a city gas. Therefore, since a hole is formed in the conveying pipeline at a position separated by about 20 cm from a carbonization position in the traveling direction, a pipeline is connected to that position in order to release a gas such as combustible chlorine or steam vapor. Then, the gas passes through a gas discharge pipeline and is guided to the desalination device (350) or a container filled with sodium solution. In the container, combustible chlorine combines with sodium to become industrial salt and accumulates at the bottom of the container. The remaining steam vapor or gas is directly discharged to the outside.

<Configuration of Treatment device of (b) Coke Production Treatment Line of "Particulate Dust">

As shown in FIG. 23(*b*), in the treatment device of (b) the coke production treatment line, the production line is a treatment device in which a lignin mixer (370) is added between the briquette pressing machine (330) and the near infrared sensor sorting device (320) for separating polyvinyl chloride except for the production of coke as a reducing agent. There is no difference from the above-described coal production line.

In the shredder dust treatment device of the invention, it is possible to improve the treatment capacity of the entire plant by newly adding one used outside the metal scrap industry or a sole invented "fibrous dust" collector at six positions in front of the large air table (120) of the crushing and sorting line. In particular, "fibrous dust" or "particulate dust" is caused to pass through a pipeline having a length of about 20 to 30 m in order to perform a cooling operation or increase a bulk density as much as possible after the solidification in the briquette pressing machine (230, 330). Then, in the course of the pipeline, a material of the briquette pressing machine is inserted into a special artificial casing while using a pressing force, is carbonized by the carbonization device (250, 340), and is sealed or vacuum-sealed by the sealing device (240, 360), thereby producing high-quality fuel for a thermal power plant, a defoamer for an electric furnace, or a reducing agent or coke for a blast furnace or an electric furnace. Since both dusts are combustible and contain gasoline and oil, there is an effect of preventing ignition and deterioration of the material by sealing them.

In the case of the household service fuel, slaked lime (calcium hydroxide) or hypo (sodium thiosulfate) is added to neutralize the combustible chlorine content remaining slightly in the "fibrous dust", and then the dust is placed in a pelletizer to be solidified into the size of a thumb, and can be used as fuel for household and commercial stoves and outdoors.

<Treatment Object (Coated Copper Wire Crushing and Sorting Treatment)>

The shredder dust treatment method and the shredder dust treatment device of the invention can be directly used in a plant that crushes and sorts coated copper wires using the contents of ASR such as paper, iron, copper, aluminum, rubber, polyvinyl chloride, and other plastic materials in waste automobiles, waste home appliances, and waste office furniture as the conducting material, the insulating material, the coating material, and the reinforcing material. The configuration of the plant is as shown in the above-described drawings and the fueling process is as shown in each of FIG. 2 and subsequent drawings.

For example, it has become impossible to replace utility poles with new ones in Tokyo. From now on, an electric wire undergrounding operation will progress unavoidably not only in Tokyo but nationwide. All wires which are currently used while being supported by the utility pole will be discarded after the removal thereof. Waste cables covered with hard coating for outdoor use will inevitably flow to the recycling market in large quantities. Since coated copper wires cannot be exported to China from March 2018, this waste must be processed domestically. Even in such a case, if there is a plant combined with the treatment machine of the invention, the waste can be treated in large quantities without any problem.

Therefore, the shredder dust treatment method and the shredder dust treatment device of the invention correspond to a technique that greatly contributes to the treatment of coated copper wire discarded in large quantities.

<Treatment Object (Mill Scale Solidifying Treatment)>

Wastes containing iron that falls off from the surface during the rolling process of the electric furnace is called mill scale. Also in the invention, as described above, the mill scale is described as an additive for increasing the bulk density in the reducing agent/defoamer production line of FIG. 2(*d*). This mill scale contains about 70% of the highly ignitable iron oxide (FeO). At present, an iron component is separated by a magnet, becomes reduced iron and sintered steel of a blast furnace, and is used as a material equivalent to pig iron and as a material for rust prevention. Since an iron oxide will not come in contact with oxygen in the air when the briquette pressing machine (230) and the sealing device (240) used in the invention are used, the possibility of spontaneous combustion can be significantly reduced. At present, blast furnaces and electric furnace makers, and scrapers are trying to solidify the dust, but no good result is obtained. No good result is obtained also in the solidifying method of applying a high pressure by using "fibrous dust" as a binder without using the vacuum sealing system of the invention.

However, in the case of sorted iron oxide, it is more economical and rational to directly insert the dust into the artificial casing used in the invention and to solidify the dust in a vacuum sealed state. Mill scale can be directly used as a reducing agent for a blast furnace. Therefore, mill scale is pressed and inserted into the artificial casing by using the briquette pressing machine (230) and the sealing device (240) of the invention. Here, a combination of a screw conveyor disposed in a vertical axis to insert a material and a pusher disposed in a horizontal axis only to insert mill scale falling off from the screw conveyor while being pushed into an artificial casing can be simply used.

Furthermore, there is no need for a screw conveyor or pusher if the mill scale (iron oxide) falls into an artificial casing or empty can by gravity and is sealed therein. In the case of the artificial casing, the filled mill scale is sealed by a clipper. In the case of the empty can, the mill scale becomes a reducing agent or steelmaking subsidiary material only when a cover is closed.

Furthermore, the invention is not limited to the above-described embodiments of the invention as long as "fibrous dust" or "particulate dust" corresponding to simple wastes in the past can be used as resources and the treatment ability can be improved and can be, of course, modified into various forms without departing from the spirit of the invention.

INDUSTRIAL APPLICABILITY

The shredder dust treatment method of the invention can be used, not being limited to waste automobiles, waste home appliances, and waste office furniture, in other industrial machines.

REFERENCE NUMERALS

S1 CRUSHING STEP
S2 PRIMARY DUST COLLECTING STEP
S3 IRON COMPONENT SEPARATION AND COLLECTION STEP
S4 NON-FERROUS COMPONENT SEPARATION AND COLLECTION STEP
S5 PRIMARY METAL COMPONENT SEPARATION AND COLLECTION STEP
S6 WIND POWER SORTING STEP
S7 SHREDDING STEP
S8 SECONDARY DUST COLLECTING STEP
S9 STIRRING STEP
S10 PULVERIZING STEP (TURBO MILL)
S11 FIBROUS DUST/PARTICULATE DUST SEPARATION STEP
S12 HAIRY COPPER SEPARATION AND COLLECTION STEP
S13 SECONDARY METAL COMPONENT SEPARATION AND COLLECTION STEP
S21 FIBROUS DUST TREATMENT STEP
S31 HAIRY COPPER SEPARATION AND COLLECTION STEP
S32 ALUMINUM SORTING STEP
S33 PARTICULATE DUST TREATMENT STEP
S211 CHLORINE NEUTRALIZER MIXING STEP
S212 SOLIDIFICATION STEP
S213 BRIQUETTE PRESSING STEP
S214 SEALING STEP
S215 LIGNIN MIXING STEP
S216 CARBONIZATION STEP
S217 DESALINATION STEP
S218 ORGANIC/INORGANIC MIXING STEP
S219 IRON ROD INSERTING STEP
S2110 PULVERIZATION STEP
S2111 PARTICLE CLASSIFYING/CLASSIFYING STEP
S311 OPTICAL COLOR SORTING STEP
S312 ALUMINUM/POLYVINYL CHLORIDE SEPARATION STEP
S313 BRIQUETTE PRESSING STEP
S314 CARBONIZATION STEP
S315 DESALINATION STEP
S316 SEALING STEP
10 CRUSHER
20 VIBRATION TYPE DUST COLLECTOR
30 SUSPENDED MAGNETIC SEPARATOR ATTACHMENT VIBRATION CONVEYOR
40 MAGNET DRUM A
50 AUTOMATIC NON-FERROUS SEPARATOR
60 METAL DETECTOR ATTACHMENT SORTER
70 WIND POWER SORTING DEVICE (V-SHAPED WIND POWER SORTING DEVICE)
80 SHREDDING MACHINE
90 METERING FEEDER
100 LARGE TURBO MILL
110 CYCLONE
130 HAIRY COPPER SEPARATION CIRCULAR VIBRATION SIEVE
140 MAGNET DRUM B
201 SUPPLY PORT
202 SUCTION PIPELINE
203 DISTURBING MEMBER
204 ZIGZAG PIPELINE
205 VIBRATION GENERATOR
206 CONVEYOR
207 AIR VOLUME CONTROL VALVE (DAMPER)
210 MIXER
220 PELLETIZER
230 BRIQUETTE PRESSING MACHINE
240 SEALING DEVICE
250 CARBONIZATION DEVICE
260 DESALINATION DEVICE
270 INORGANIC MIXER
280 PULVERIZER
290 PARTICLE CLASSIFIER AND CLASSIFIER
310 CIRCULATION TYPE OPTICAL COLOR SORTING DEVICE
320 NEAR INFRARED SENSOR SORTING DEVICE
330 BRIQUETTE PRESSING MACHINE
340 CARBONIZATION DEVICE
350 DESALINATION DEVICE
360 SEALING DEVICE
701 PIPELINE BODY
702 BRANCH PIPELINE
703 INLET
704 LARGE ROTARY VALVE
705 LOWER DISCHARGE PORT
706 UPPER DISCHARGE PORT
901$a$ HIGH-SPEED STIRRING BLADE
901$b$ LOW-SPEED STIRRING BLADE
902 CYLINDRICAL BODY
903 INLET
904 UPPER DISCHARGE PORT
905 LOWER DISCHARGE PORT
906 PARTITION PLATE

The invention claimed is:
1. A shredder dust treatment method of further collecting metal scraps from a residue (shredder dust) in which valuable materials are separated from a material obtained by crushing wastes and processing a remaining residue into a useful industrial material, comprising:
a crushing step (S1) of crushing the wastes into a predetermined size;
a primary dust collecting step (S2) of collecting fibrous dust separated by the crushing step (S1);
an iron component separation and collection step (S3) of separating and collecting a magnetic material containing an iron component in a crushed material obtained by the crushing step (S1);
a non-ferrous component separation and collection step (S4) of using a homopolar magnet to separate and collect a non-ferrous component which is not picked up by a magnetic force and is contained in the crushed material separated by the iron component separation and collection step (S3);
a step (S5) of separating and collecting stainless steel which is not separated by the non-ferrous component separation and collection step (S4) and is discharged while being contained in non-metal by the combination of a metal detector and an air jet nozzle of ejecting jet air;

a wind power sorting step (S6) of sorting the crushed material separated by the metal component separation and collection step (S5) into lightly floating fibrous dust and a settled crushed material;

a shredding step (S7) of shredding particulate dust separated by settling in the wind power sorting step (S6) into a predetermined size;

a secondary dust collecting step (S8) of collecting the fibrous dust generated by the shredding step (S7);

a stirring step (S9) of separating the fibrous dust and the particulate dust shredded and crushed by the shredding step (S7) while tapping the dust in a metering feeder by a stirring blade; and a fibrous dust/particulate dust separation step (S11) of separating the crushed material shredded by the shredding step (S7) into fibrous dust and particulate dust, wherein the fibrous dust generated when being separated by each of the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) is collected, and wherein the particulate dust separated by the fibrous dust/particulate dust separation step (S11) is collected.

2. The shredder dust treatment method according to claim 1, further comprising:

a treatment step of mixing the fibrous dust generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) with a chlorine neutralizer and solidifying the mixture into about a thumb size by a compressing/molding machine called a pelletizer or a charcoal production machine in order to use the fibrous dust as household service fuel.

3. The shredder dust treatment method according to claim 1, further comprising:

a briquette pressing step (S213) of highly compressing the fibrous dust generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) and solidifying the fibrous dust into a predetermined size in order to produce household service/industrial fuel as a substitute for coal; and a sealing step (S214) of sealing the fibrous dust in a briquette state solidified by the briquette pressing step (S213).

4. The shredder dust treatment method according to claim 1, further comprising:

a lignin mixing step (S215) of adding lignin to the fibrous dust generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11);

a carbonization step (S216) of solidifying the mixture at a high pressure by the briquette pressing step (S213) and carbonizing the mixture; and a sealing step (S214) of sealing the mixture to produce a coke product.

5. The shredder dust treatment method according to claim 1, further comprising:

an organic/inorganic mixing step (S218) of mixing an inorganic material derived from ASR with the fibrous dust generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) in addition to iron powder or mill scale;

a briquette pressing step (S213) of highly compressing the fibrous dust mixed with iron powder, mill scale, clay, sand, slag, and soil, glass, and pottery derived from ASR by the organic/inorganic mixing step (S218) and solidifying the fibrous dust into a predetermined size to produce a defoamer used in a converter; and a sealing step (S214) of sealing the fibrous dust changed into the briquette state by the briquette pressing step (S213).

6. The shredder dust treatment method according to claim 1, further comprising:

a briquette pressing step (S213) of highly compressing the fibrous dust generated when being separated by the crushing step (S1), the primary dust collecting step (S2), the non-ferrous component separation and collection step (S4), the wind power sorting step (S6), the secondary dust collecting step (S8), the stirring step (S9), and the fibrous dust/particulate dust separation step (S11) and solidifying the fibrous dust into a predetermined size;

an iron rod inserting step (S219) of inserting an iron rod into the fibrous dust in the briquette state solidified by the briquette pressing step (S213) in a longitudinal direction thereof; and a sealing step (S214) of sealing the fibrous dust in the briquette state into which the iron rod is inserted by the iron rod inserting step (S219).

7. The shredder dust treatment method according to claim 1, further comprising:

a pulverization step (S2110) of pulverizing the fibrous dust separated and collected by the fibrous dust/particulate dust separation step (S11); and a particle classifying/classifying step (S2111) of performing a particle classifying/classifying process on the fibrous dust pulverized by the pulverization step (S2110) into several stages.

8. The shredder dust treatment method according to claim 1, further comprising:

an optical color sorting step (S311) of sorting aluminum scrap from the particulate dust separated and collected by the fibrous dust/particulate dust separation step (S11);

an aluminum/polyvinyl chloride separation step (S312) of conveying particulate dust changed to have similar properties to those of the fibrous dust by eliminating the aluminum scrap from the particulate dust by the optical color sorting step (S311) and eliminating polyvinyl chloride by a near infrared sensor attachment sorting device to a fibrous dust accumulation site;

a briquette pressing step (S313) of highly compressing the particulate dust from which aluminum or polyvinyl chloride is eliminated by the aluminum/polyvinyl chloride separation step (S312) and solidifying the particulate dust into a predetermined size;

a carbonization step (S314) of desalinating the particulate dust changed into a briquette state by the briquette pressing step (S313) while carbonizing the particulate dust; and a sealing step (S316) of sealing the particulate dust carbonized by the carbonization step (S314) in an artificial casing.

9. The shredder dust treatment method according to claim 8, further comprising:

a lignin mixing step (S317) which is provided between the aluminum/polyvinyl chloride separation step (S312) and the briquette pressing step (S313) to add lignin corresponding to industrial waste discharged from a paper making company to porous polyurethane.

10. The shredder dust treatment method according to claim 3, wherein the sealing step (S214, S316) is a vacuum sealing step of performing a sealing process in a vacuum state.

11. The shredder dust treatment method of using the shredder dust treatment method according to claim 1 for a treatment of crushing and sorting a coated copper wire using paper, iron, copper, aluminum, rubber, polyvinyl chloride, and other plastic materials corresponding to contents of ASR as a conducting material, an insulating material, a coating material, and a reinforcing material in waste automobiles, waste home appliances, and waste office furniture.

12. A shredder dust treatment device for sorting metal, non-ferrous metal, and non-metal from shredder dust obtained by crushing wastes and collecting a valuable material, comprising:

a crusher (10) which crushes the wastes into a predetermined size;

a first vibration type dust collector (20A) which separates fibrous dust from a crushed material crushed by the crusher (10);

an iron component separation and collection device (30, 40) which separates and collects an iron component from the crushed material from which the fibrous dust is separated by the first vibration type dust collector (20A);

a non-ferrous component separation and collection device (50) which separates and collects a non-ferrous component of the crushed material separated by the iron component separation and collection device (30, 40);

a metal detector attachment sorter (60) which sorts metal components mainly including as stainless steel and wire harness in the crushed material separated by the non-ferrous component separation and collection device (50) by using air jet ejected from a nozzle;

a wind power sorting device (70) which sorts the crushed material sorted by the metal detector attachment sorter (60) into floating fibrous dust and a settled crushed material by using wind power;

a shredding machine (80) which shreds the crushed material separated by settling in the wind power sorting device (70) into a particle size of 8 mm or less;

a second vibration type dust collector (20B) which separates particulate dust and fibrous dust containing a large amount of copper wire or polyvinyl 1 chloride from the crushed material shredded into a predetermined size by the shredding machine (80); and a metering feeder (90) which separates fibrous dust from particulate dust of the crushed material from which a copper component is separated by the second vibration type dust collector (20B), wherein the first vibration type dust collector (20A) or/and the second vibration type dust collector (20B) includes:

a supply port (201) which supplies a crushed material pulverized by the crusher (10), a suction pipeline (202) which is disposed toward a top of the supply port (201), a disturbing member (203) which is provided in the course of the suction pipeline (202) to disturb the suction of the crushed material other than fibrous dust, a zigzag pipeline (204) which is disposed toward a bottom of the supply port (201) and includes a plurality of bends in a pipeline, and vibration generation means (205) for vibrating the entire device.

13. The shredder dust treatment device according to claim 12, wherein the first vibration type dust collector (20A) or/and the second vibration type dust collector (20B) is further provided with an ultrasonic wave irradiation device for easily separating the wire harness stuck to polyurethane of the crushed material.

14. The shredder dust treatment device according to claim 12, wherein the wind power sorting device (70) includes:

a pipeline body (701) through which an air stream flows from a bottom to a top, an inlet (703) which opens to a top of a branch pipeline (702) provided in the course of the pipeline body (701) and through which the crushed material is input, a rotation blade (704) which is attached between the inlet (703) and the branch pipeline (702) to keep air-tightness of the pipeline body (701), an upper discharge port (706) which discharges fibrous dust to an upper portion of the pipeline body (701), and a lower discharge port (705) which discharges a settled crushed material to a lower portion.

15. The shredder dust treatment device according to claim 12, wherein the metering feeder (90) includes:

a cylindrical body (902) which has a cylindrical shape and includes a high-speed stirring blade (901a) and a low-speed stirring blade (901b) provided as two upper and lower stages at a lower portion and rotating horizontally, an inlet (903) which is provided in a periphery or an upper portion of the cylindrical body (902) and through which a crushed material is input, an upper discharge port (904) which is provided on a side opposite to the inlet (903) of the cylindrical body (902) to open upward and discharges fibrous dust having a light weight in the crushed material, a lower discharge port (905) which is provided in a periphery or a lower portion of the cylindrical body (902) and discharges a crushed material heavier than the separated fibrous dust, and a partition plate (906) which is provided between the inlet (903) for a crushed material and the upper discharge port (904) for fibrous dust of the cylindrical body (902) so that dust heavier than fibrous dust is not sucked from the upper discharge port (904), and wherein the high-speed stirring blade (901a) rotates at a high speed as compared with the low-speed stirring blade (901b) at the lower portion and fibrous dust is separated from particulate dust heavier than fibrous dust while the dust is tapped by the high-speed stirring blade (901a).

16. The shredder dust treatment device according to claim 12, further comprising:
a device which inserts mill scale corresponding to iron scraps containing an iron component and falling off from a surface in a rolling step into an artificial casing by pushing the mill scale thereinto using a briquette pressing machine and a sealing device and has a combination of a screw conveyor provided in a vertical shaft to insert a material and a pusher provided in a horizontal shaft to insert mill scale falling off while being pushed by the screw conveyor so that the mill scale is inserted into an artificial casing or an empty can.

* * * * *